US010602729B2

(12) United States Patent
Nagai

(10) Patent No.: US 10,602,729 B2
(45) Date of Patent: Mar. 31, 2020

(54) FISHING SPINNING REEL

(71) Applicant: GLOBERIDE, Inc., Tokyo (JP)

(72) Inventor: Ryou Nagai, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 16/352,942

(22) Filed: Mar. 14, 2019

(65) Prior Publication Data

US 2019/0297866 A1 Oct. 3, 2019

(30) Foreign Application Priority Data

Mar. 30, 2018 (JP) .................................. 2018-067843

(51) Int. Cl.
*A01K 89/01* (2006.01)
(52) U.S. Cl.
CPC .................. *A01K 89/011221* (2015.05); *A01K 89/01123* (2015.05)
(58) Field of Classification Search
CPC ...... A01K 89/01121; A01K 89/011221; A01K 89/011223; A01K 89/01126; A01K 89/01928
See application file for complete search history.

(56) References Cited

U.S. PATENT DOCUMENTS

| 10,058,081 | B2 * | 8/2018 | Ochiai | ............. | A01K 89/01085 |
| 2002/0096587 | A1 * | 7/2002 | Ikuta | .................... | A01K 89/00 |
| | | | | | 242/319 |
| 2009/0236456 | A1 * | 9/2009 | Lee | ......................... | A01K 89/01 |
| | | | | | 242/312 |
| 2013/0327870 | A1 * | 12/2013 | Hiraoka | ................. | A01K 89/01 |
| | | | | | 242/234 |
| 2014/0191071 | A1 * | 7/2014 | Hiraoka | ................. | A01K 89/01 |
| | | | | | 242/311 |
| 2018/0368377 | A1 * | 12/2018 | Shimizu | ................ | A01K 89/01 |

FOREIGN PATENT DOCUMENTS

JP 2017-108719 A 6/2017

OTHER PUBLICATIONS

Extended European Search Report dated Aug. 1, 2019, of counterpart European Application No. 19161392.1.

\* cited by examiner

*Primary Examiner* — Emmanuel M Marcelo
(74) *Attorney, Agent, or Firm* — DLA Piper LLP (US)

(57) ABSTRACT

One object is to provide a fishing spinning reel in which the seal member is safe from the outside air and the external load and the interior of the reel unit remains satisfactorily waterproof and dustproof for a long period. Provided is a fishing spinning reel including: a body constituting a reel unit and a cover member closing a rear opening portion formed in a rear portion of the body. The body has a fitting portion formed on a peripheral edge portion of the rear opening portion, the fitting portion having a tubular wall shape extending toward an inner portion of the cover member and fitted in the inner portion of the cover member. A seal member having an annular shape is interposed between the inner portion of the cover member and the fitting portion.

5 Claims, 15 Drawing Sheets

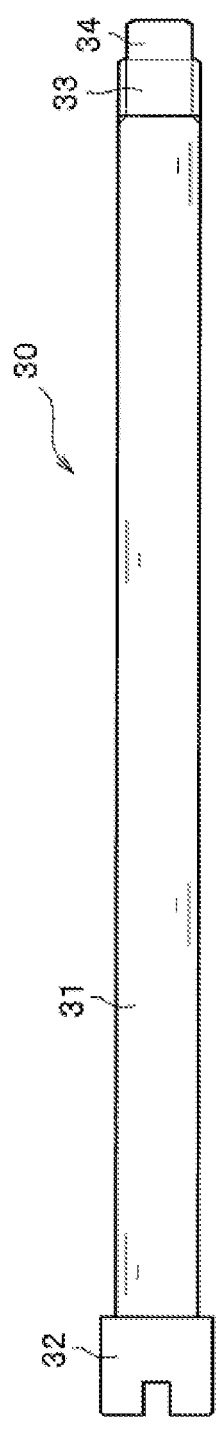
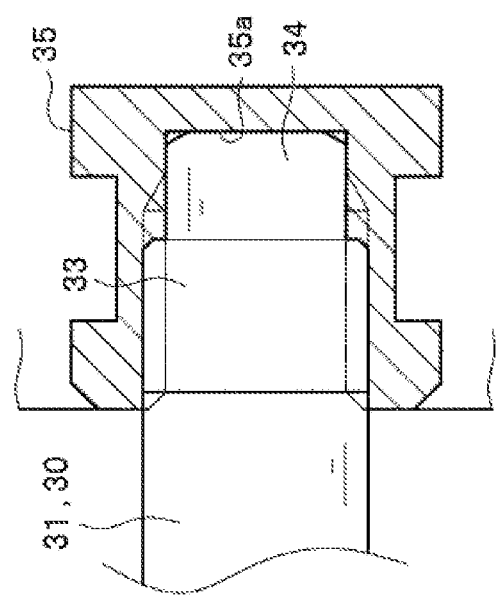
Fig. 7A
Fig. 7B

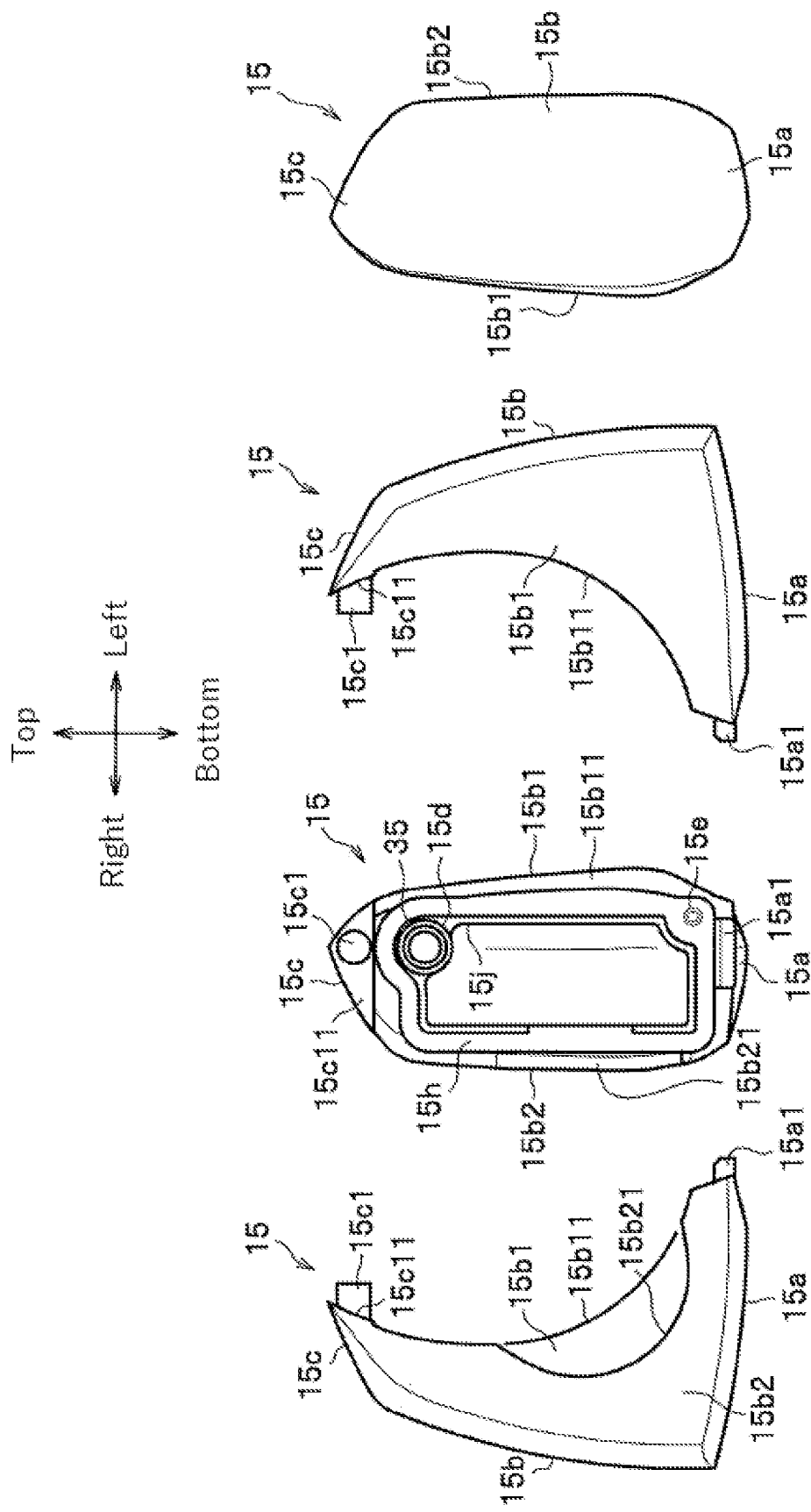

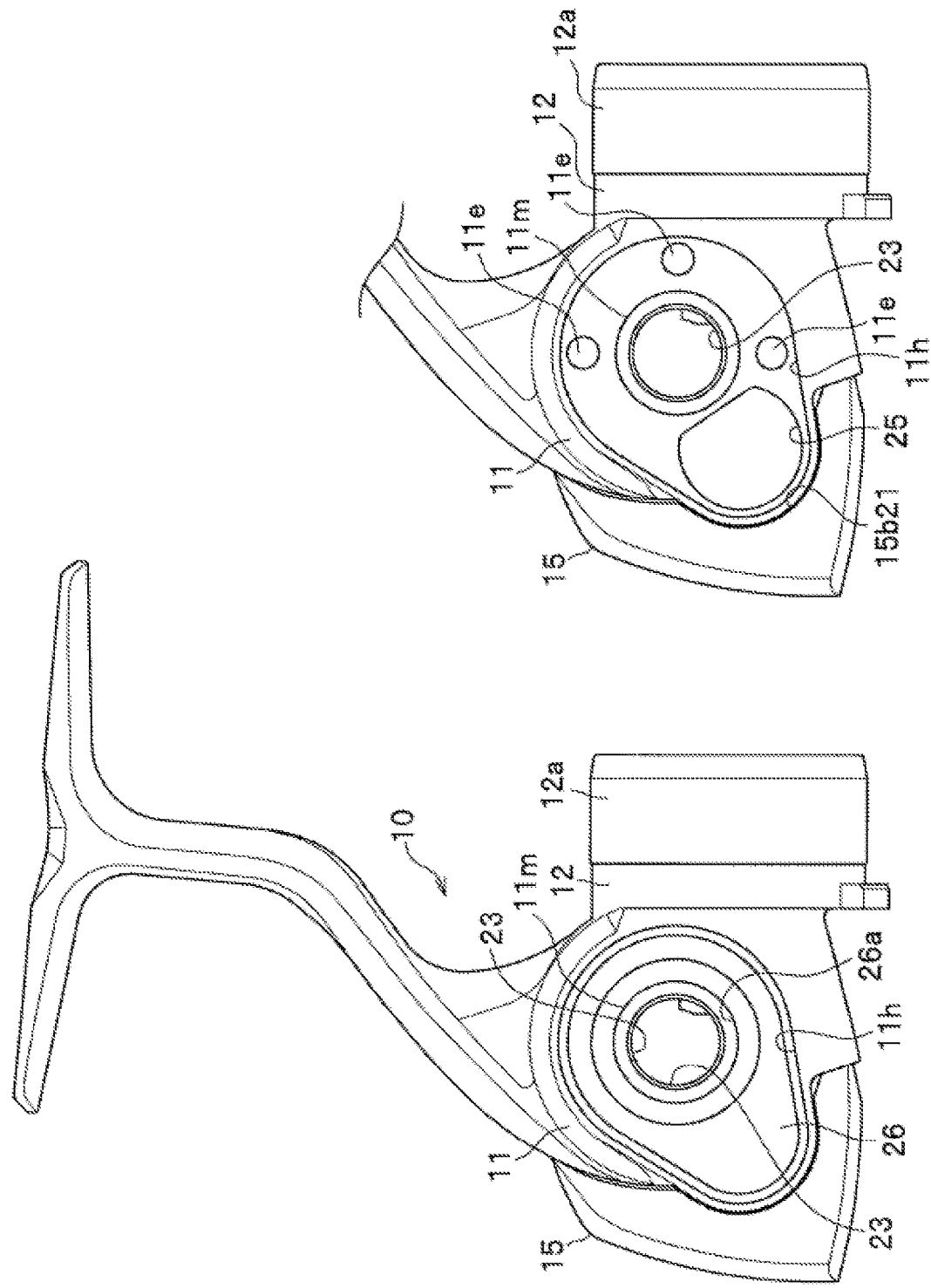

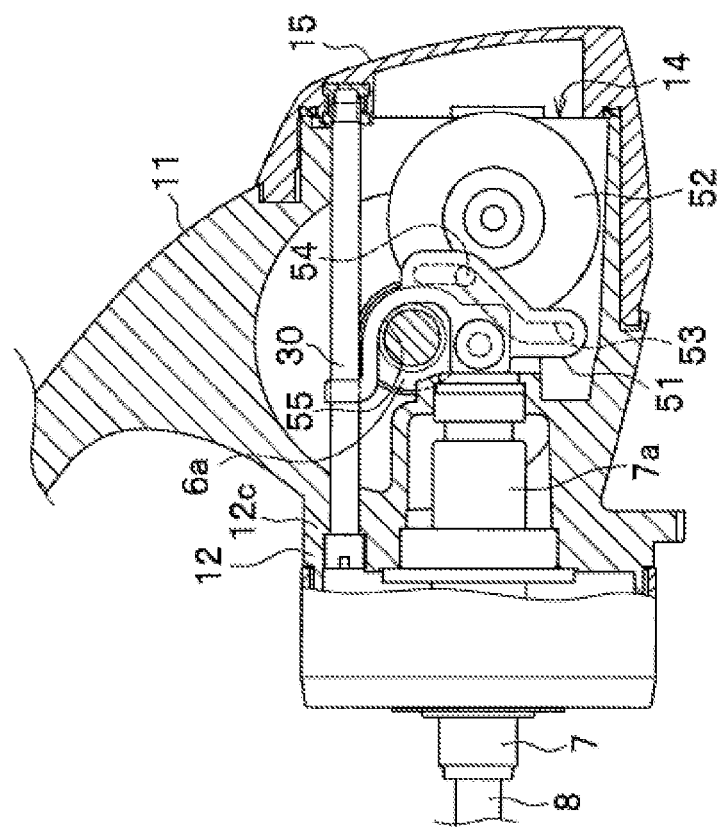
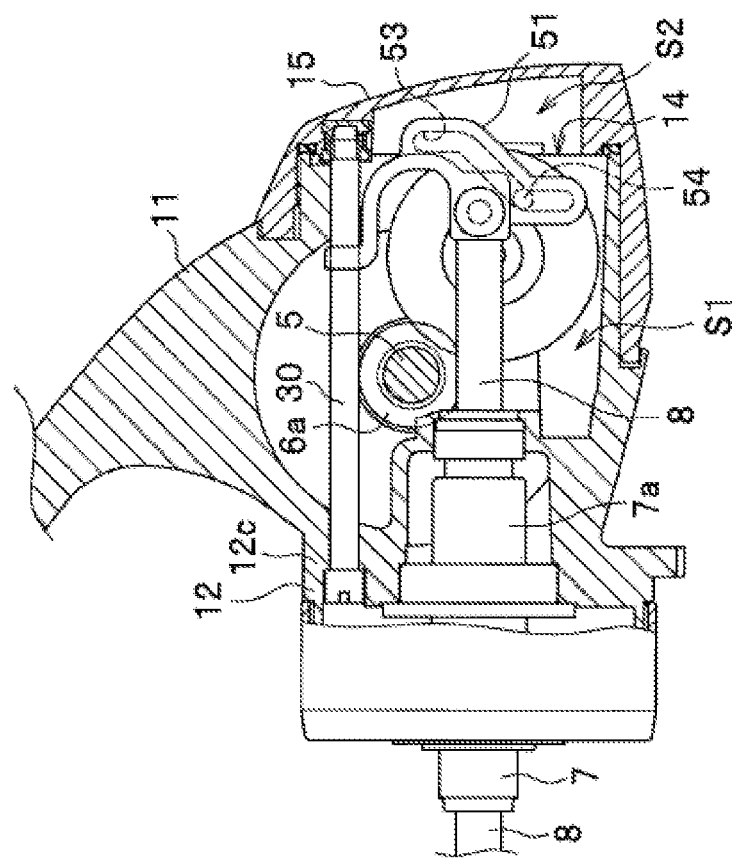
Fig. 15A
Fig. 15B

FISHING SPINNING REEL

CROSS-REFERENCE TO RELATED APPLICATIONS

This application is based on and claims the benefit of priority from Japanese Patent Application Serial No. 2018-067843 (filed on Mar. 30, 2018), the contents of which are hereby incorporated by reference in their entirety.

TECHNICAL FIELD

The present invention relates to a fishing spinning reel.

BACKGROUND

Typically, a fishing spinning reel includes a reel unit, a rotor rotatably provided in a front portion of the reel unit, and a spool provided so as to be movable in a front-rear direction in synchronization with rotary movement of the rotor and holding a fishing line wound thereon via the rotor.

One example of known fishing spinning reel is disclosed in Japanese Patent Application Publication No. 2017-108719 ("the '719 Publication"). The fishing spinning reel of the '719 Publication includes a body constituting a reel unit, a circular side opening portion having a bearing member mounted thereto, and a rear opening portion receiving at least a part of a spool reciprocation device and covered by a cover member.

The cover member is mounted on the rear opening portion with a seal member interposed between the cover member and an opening end surface contacting with the body. Thus, moisture and dust are prevented from entering the body.

In the fishing spinning reel of the '719 Publication, the seal member is interposed between an end surface of the cover member and a rear surface of the body so as to be exposed to the outside. Therefore, the seal member is exposed to the outside air and an external load, which may cause deterioration and damage in a harsh environment of fishing spots.

SUMMARY

The present invention is intended to overcome the above problem, and one object thereof is to provide a fishing spinning reel in which the seal member is safe from the outside air and the external load and the interior of the reel unit remains satisfactorily waterproof and dustproof for a long period.

In order to achieve the above-described object, a fishing spinning reel of the present invention includes: a body constituting a reel unit; and a cover member closing a rear opening portion formed in a rear portion of the body. The body has a fitting portion formed on a peripheral edge portion of the rear opening portion, the fitting portion having a tubular wall shape extending toward an inner portion of the cover member and fitted in the inner portion of the cover member. A seal member having an annular shape is interposed between the inner portion of the cover member and the fitting portion.

In the fishing spinning reel described above, the fitting portion having a tubular wall shape is sealed in the cover member, and therefore, the seal member is not exposed to the outside and thus is not affected by the outside air or the external load. Accordingly, the interior of the reel unit remains satisfactorily waterproof and dustproof for a long period.

The cover member may preferably include a retainer having an annular shape and opposed to an extended end portion of the fitting portion. In this case, the retainer has an edge rib formed on an inner peripheral edge portion thereof, the edge rib projecting toward the rear opening portion. With this arrangement, the seal member can be readily installed and retained on the retainer. As a result, the assembling operation of the seal member on the cover member is facilitated. In addition, the edge rib prohibits displacement of the seal member, and thus the seal member is suitably retained on the retainer. Accordingly, the sealing performance can be improved, and the interior of the reel unit remains satisfactorily waterproof and dustproof for a long period.

The extended end portion of the fitting portion may preferably lie in a virtual plane perpendicular to a fitting direction of the cover member onto the fitting portion. With this arrangement, the extended end portion of the fitting portion can be tightly bonded to the seal member in a suitable manner. Accordingly, the sealing performance can be improved, and the interior of the reel unit can be satisfactorily waterproof and dustproof.

In addition, it is preferable that the cover member is fitted on so as to cover the fitting portion and is fastened with one screw member. With this arrangement, the cover member is fitted on the peripheral edge portion of the rear opening portion of the body and thus is set in position, and therefore, the cover member is retained stably.

Further, it is preferable that the fishing spinning reel further includes: a side opening portion formed in a side portion of the body; and a bearing member closing the side opening portion and supporting a handle shaft, and the side opening portion has an internal screw portion formed therein, the bearing member has an external screw portion formed thereon, and the bearing member is screwed into the side opening portion and fixed thereto. With this arrangement, the bearing member is fixed to the side opening portion with a fastening force that is uniform in the circumferential direction. In addition, a plurality of screws for fastening the bearing member to the body can be made unnecessary. In this way, it is possible to reduce the number of components and facilitates assembling and disassembling operation. Further, sufficient strength in mounting the bearing member can be ensured. Since sufficient strength in mounting the bearing member can be ensured, accuracy in supporting the handle shaft and, therefore, accuracy in supporting the drive gear meshed with the pinion gear provided in the body are improved and maintained. Furthermore, the bearing member having a circular shape is mounted by screwing, so that the side opening portion of the body is reinforced, and strength of the body itself is also improved. In addition, when the body is made of a synthetic resin material, the presence of the fitting portion provided in the rear portion of the body reduces the occurrence of sink around the side opening portion. This prevents deformation of the body and improves the accuracy in screwing of the bearing member onto the side opening portion.

ADVANTAGES

The present invention provides a fishing spinning reel in which the seal member is safe from the outside air and the external load and the interior of the reel unit remains satisfactorily waterproof and dustproof for a long period.

BRIEF DESCRIPTION OF THE DRAWINGS

FIG. 7A is an enlarged side view of a screw member, and FIG. 7B is an enlarged sectional view showing the screw member and an internal screw member screwed together.

FIG. 8A is a front view of the cover member; FIG. 8B is a left side view of the same; FIG. 8C is a right side view of the same; and FIG. 8D is a rear view of the same.

FIG. 12A is a right side view of the reel unit, and FIG. 12B is a right side view of the reel unit from which a support member is removed.

FIG. 15A is a longitudinal sectional view of the reel unit in which a slider is at the rearmost end position of a stroke, and FIG. 15B is a longitudinal sectional view of the reel unit in which the slider is at the foremost end position of the stroke.

DESCRIPTION OF THE EMBODIMENTS

Embodiments of a fishing spinning reel according to the present disclosure will be now described with reference to the drawings. In the following descriptions, terms "front-rear" and "top-bottom" refer to the directions shown in FIG. 1, and a term "left-right" refers to the direction shown in FIG. 4.

Figure 1:
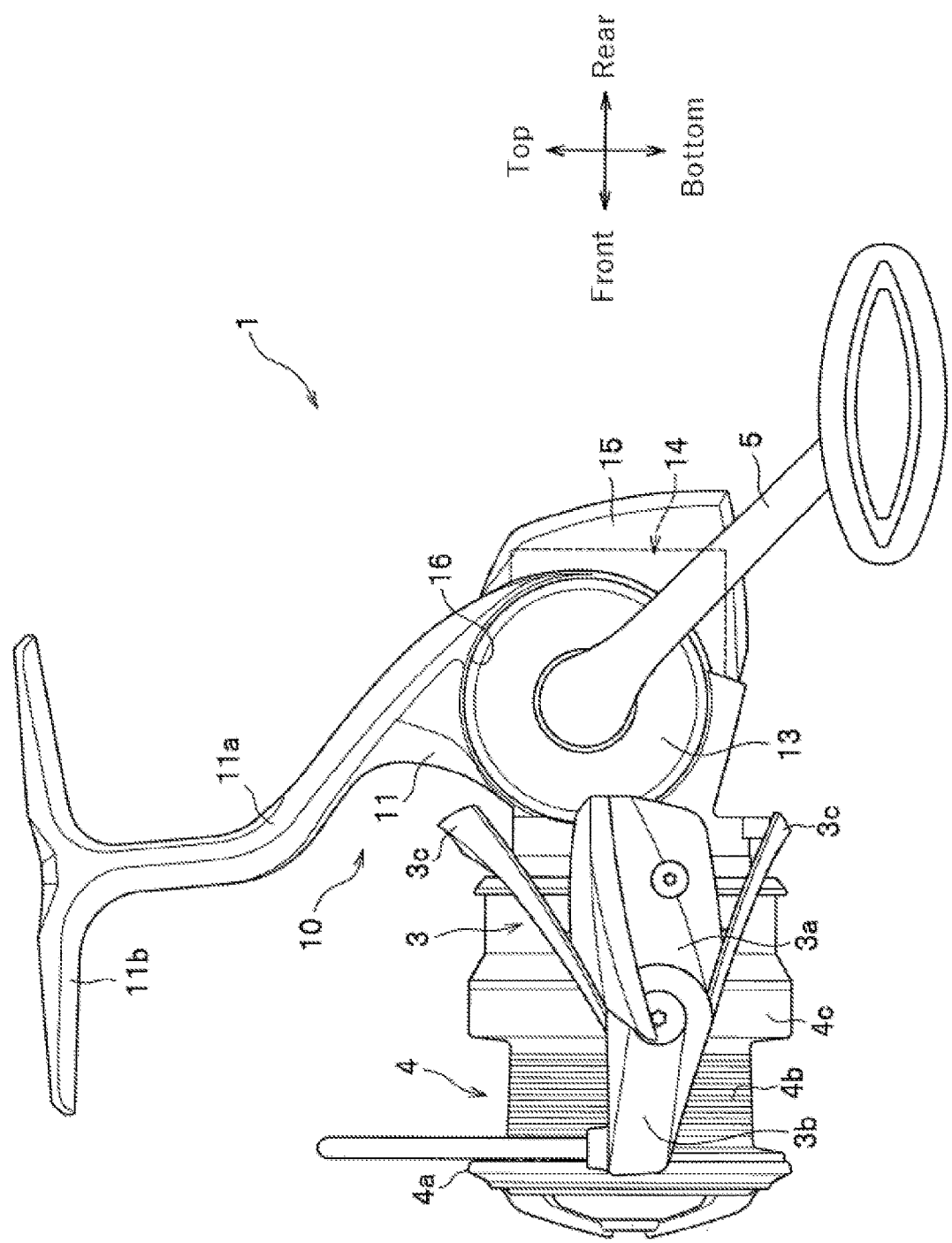
FIG. 1 is a side view showing an entire arrangement of a fishing spinning reel according to one embodiment of the present invention.
Figure 2:
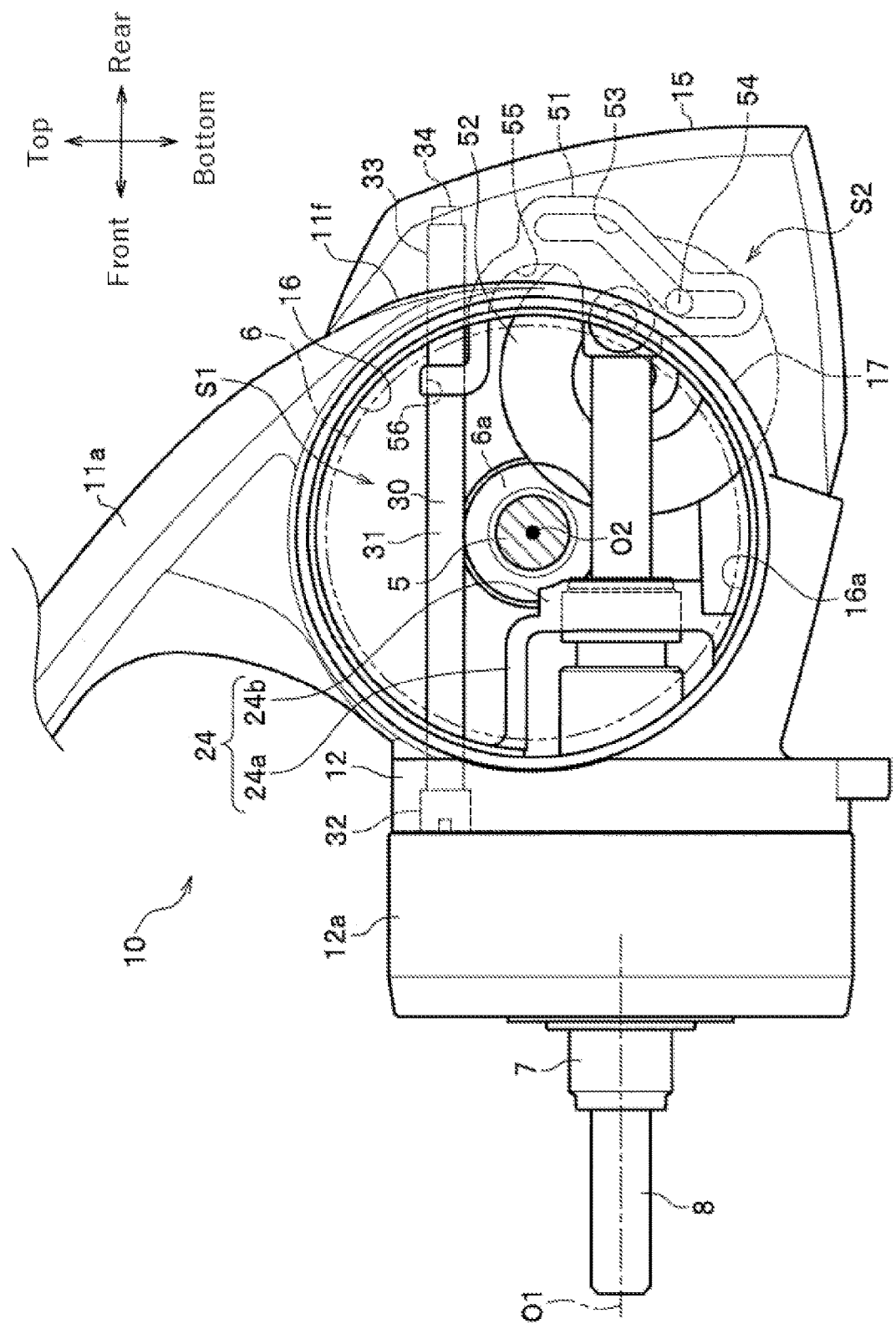
FIG. 2 is a side view of a reel unit from which a bearing member is removed.

Referring to FIGS. 1 and 2, a fishing spinning reel 1 includes a reel unit 10 provided with a drive shaft sleeve 7 (see FIG. 2) and a spool shaft 8 (see FIG. 2) both projecting frontward. The fishing spinning reel 1 also includes a rotor 3 and a spool 4. The rotor 3 is mounted on the drive shaft sleeve 7 and disposed on a front side of the reel unit 10, and the spool 4 is mounted on the spool shaft 8 and disposed on a front side of the rotor 3.

The rotor 3 includes a cylindrical portion that is fixed to a front end of the drive shaft sleeve 8 and having a rear opening portion formed therein. The rotor 3 also includes a pair of arms 3a (FIG. 1 shows only one of the arms 3a) that extend outward and then frontward from the rear end portion of the cylindrical portion. On each of the pair of arms 3a, there is mounted a bail support member 3b so as to be rotatable and movable to a fishing line winding position or a fishing line releasing position. Further, the rotor 3 includes a pair of reinforcement members 3c (see FIG. 1) each extending in the circumferential direction between the pair of arms 3a and connecting between the pair of arms 3a.

As shown in FIG. 1, the spool 4 includes a front flange 4a, a line winding trunk 4b, and a skirt portion 4c that are arranged in the stated order from the front.

As shown in FIG. 1, the reel unit 10 is made of a synthetic resin material or a metal material. The reel unit 10 includes a body 11, a body front portion 12 (see FIG. 2), a bearing member 13, a peripheral wall portion 14, and a cover member 15. The body 11 includes a side opening portion 16 that is open leftward and a rear opening portion 17 that is open rearward (see FIGS. 2, 3, and 6B). In FIG. 6A, the portion denoted by the sign 17a is an inner surface of the peripheral wall portion 14 that is continuous from the rear opening portion 17.

On top of the body 11, there is provided a leg 11a extending upward. On the distal end portion of the leg 11a, there is formed a rod mounting portion 11b (see FIG. 1) to be mounted on a fishing rod. The bearing member 13 is a lid member that closes the side opening portion 16. The peripheral wall portion 14 is a wall member that projects rearward from the peripheral edge portion of the rear opening portion 17 (the edge of the opening) and is configured to receive the cover member fitted thereon. The cover member 15 is fitted on the peripheral wall portion 14 to close the rear opening portion 17. Note that a space inside the body 11 may also be hereunder referred to as a space "inside the body 11" or a "housing space S1."

Figure 4:
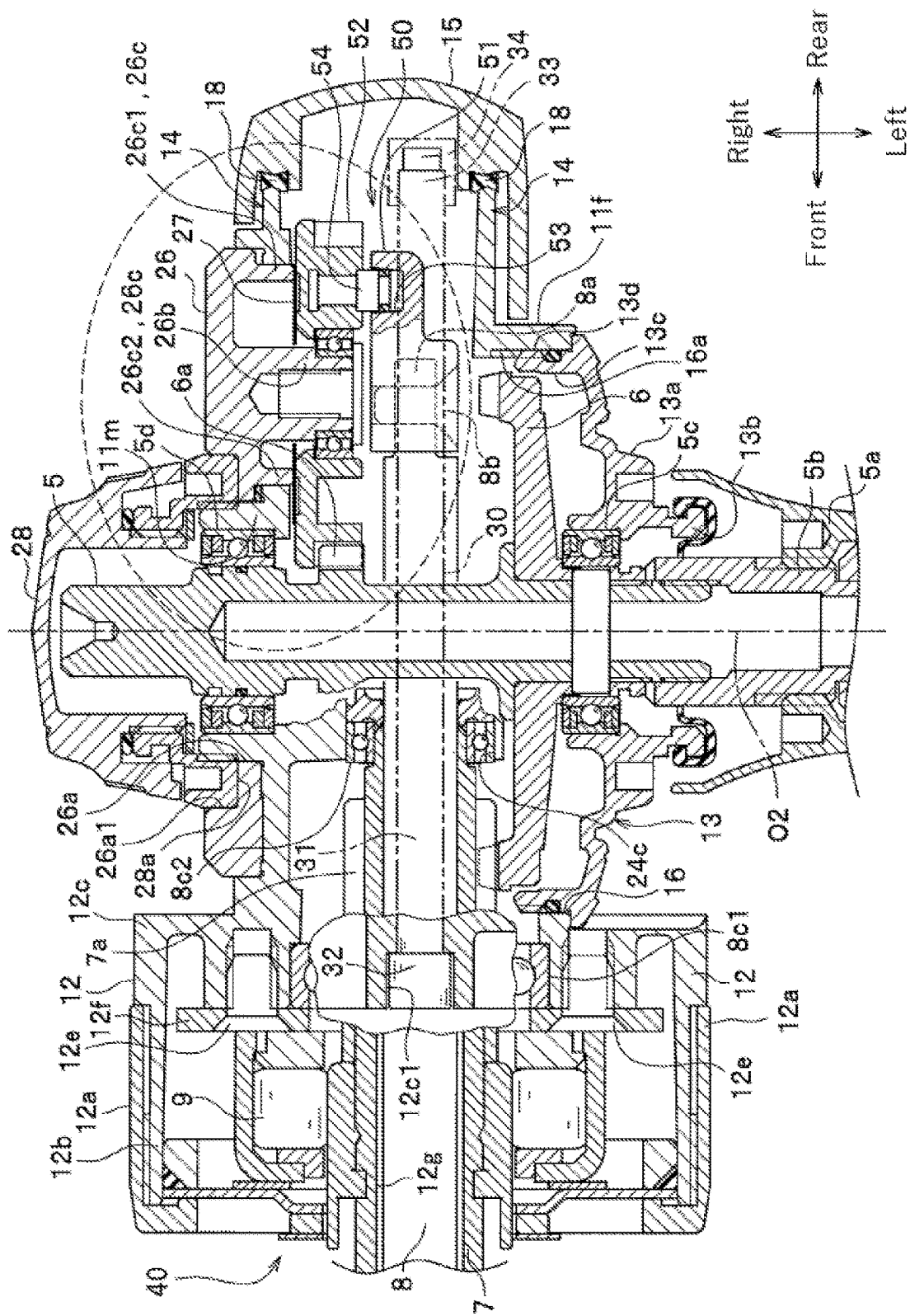
FIG. 4 is a sectional view of the reel unit in FIG. 2 cut by a plane extending along the spool shaft in a left-right direction and a front-rear direction.

As shown in FIG. 4, the body front portion 12 generally has a bottomed cylindrical shape including a cylindrical wall portion 12b and a bottom portion 12c. The body front portion 12 contains the drive shaft sleeve 7 (a drive portion), a front bearing 8c1, and a roller-based one-way clutch 9 (hereinafter referred to as "the one-way clutch 9") as functional components. A sealing mechanism 40 such as a known magnetic fluid or elastic seal material is provided to seal tightly between a front opening portion of the body front portion 12 and the drive portion.

The drive shaft sleeve 7 extends toward the spool 4 (see FIG. 1), and the rotor 3 (see FIG. 1) is attached at the distal end of the drive shaft sleeve 7. The front bearing 8c1 is disposed in the middle of the bottom portion 12c and rotatably supports a front portion of the drive shaft sleeve 7. The front bearing 8c1 is prevented from coming off by a plate 12f fastened on a front surface of the bottom 12c with screws 12e.

The one-way clutch 9 works as a known backstop (stopper) to prevent reverse rotation of the handle 5a (the rotor 2, see FIG. 1) in a fishing line releasing direction. The one-way clutch 9 is covered with the cylindrical wall portion 12b of the body front portion 12. A magnetic fluid seal mechanism 40 seals the distal end portion of the magnetic member 12g (an inner ring) tightly adhered to the drive shaft sleeve 7 (the drive portion) that rotates in association with the operation of the handle 5a radially inside the one-way clutch 9.

A rear end of the drive shaft sleeve 7 is situated in the body 11. A pinion gear 7a is formed at the rear end of the drive shaft sleeve 7.

Figure 3:
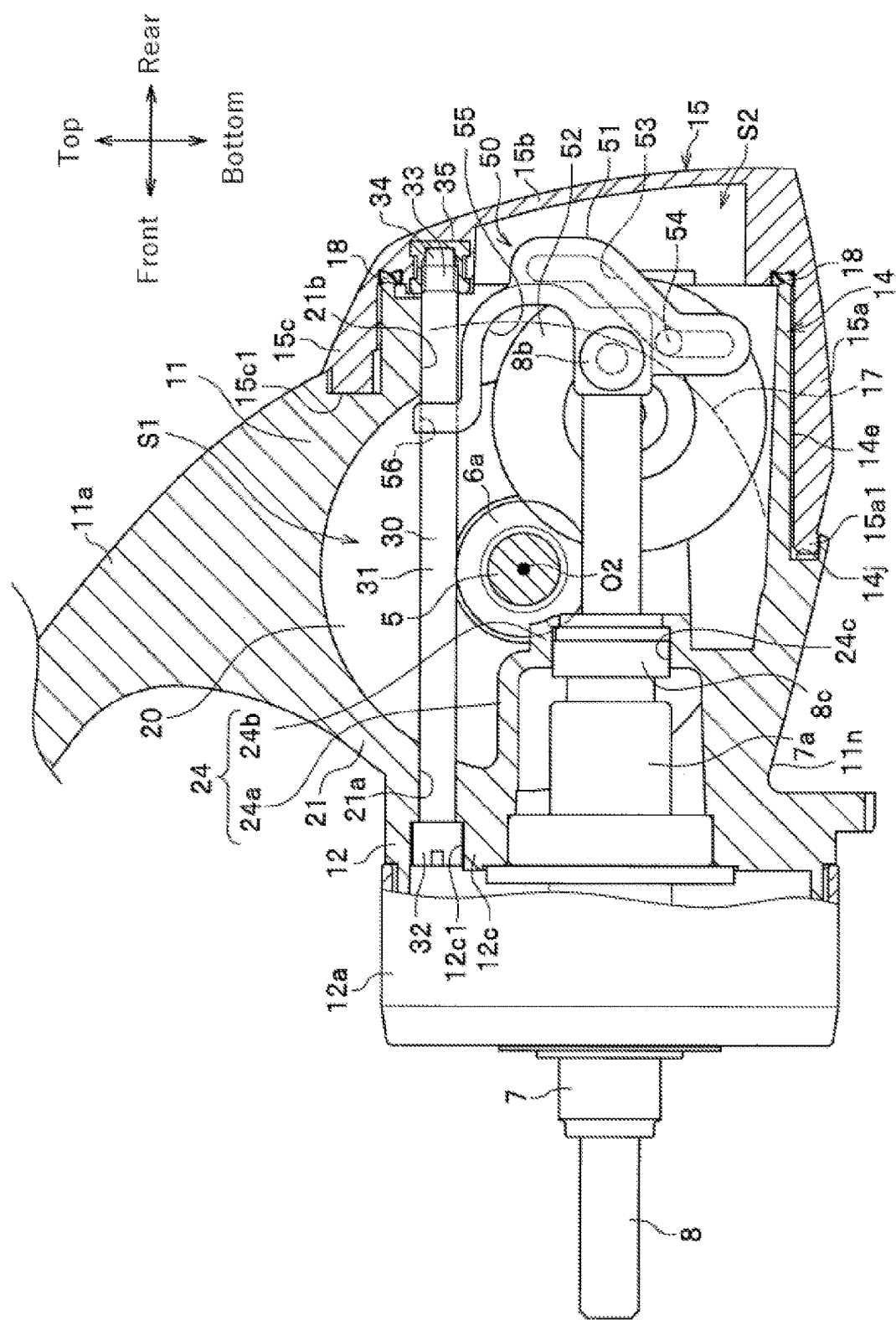
FIG. 3 is a sectional view of the reel unit in FIG. 2 cut by a plane extending along a spool shaft in a top-bottom direction and a front-rear direction.
Figure 10B:
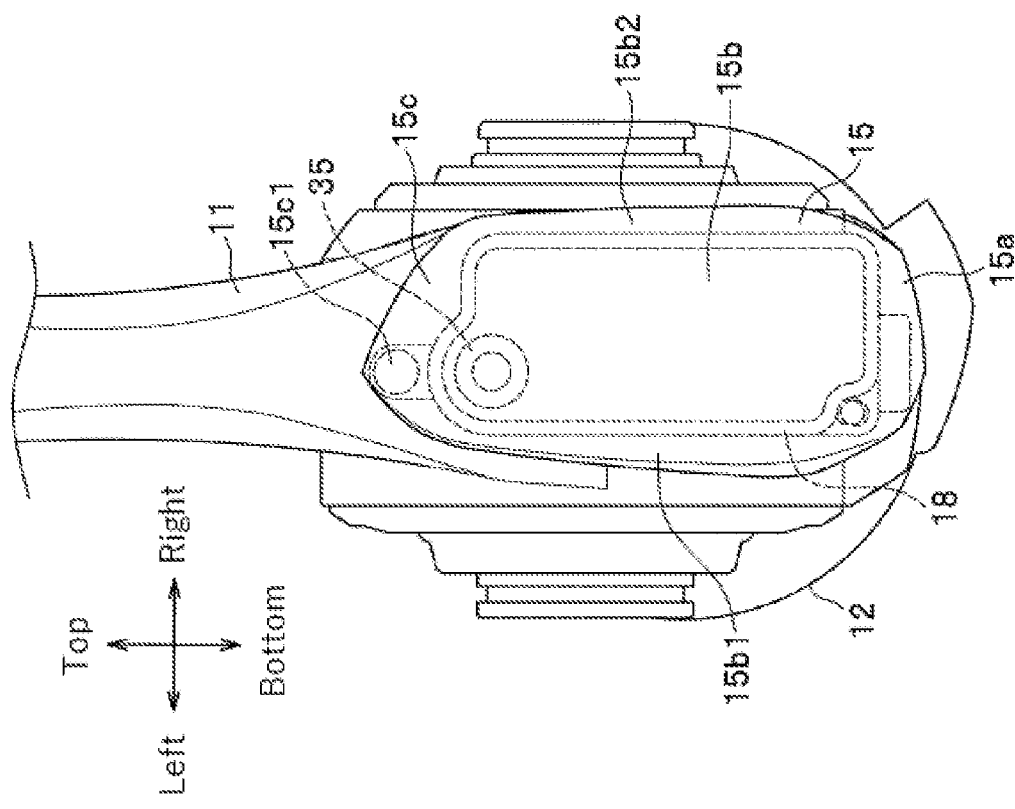
FIG. 10B is a rear view of the reel unit having the cover member mounted thereto.
Figure 10A:
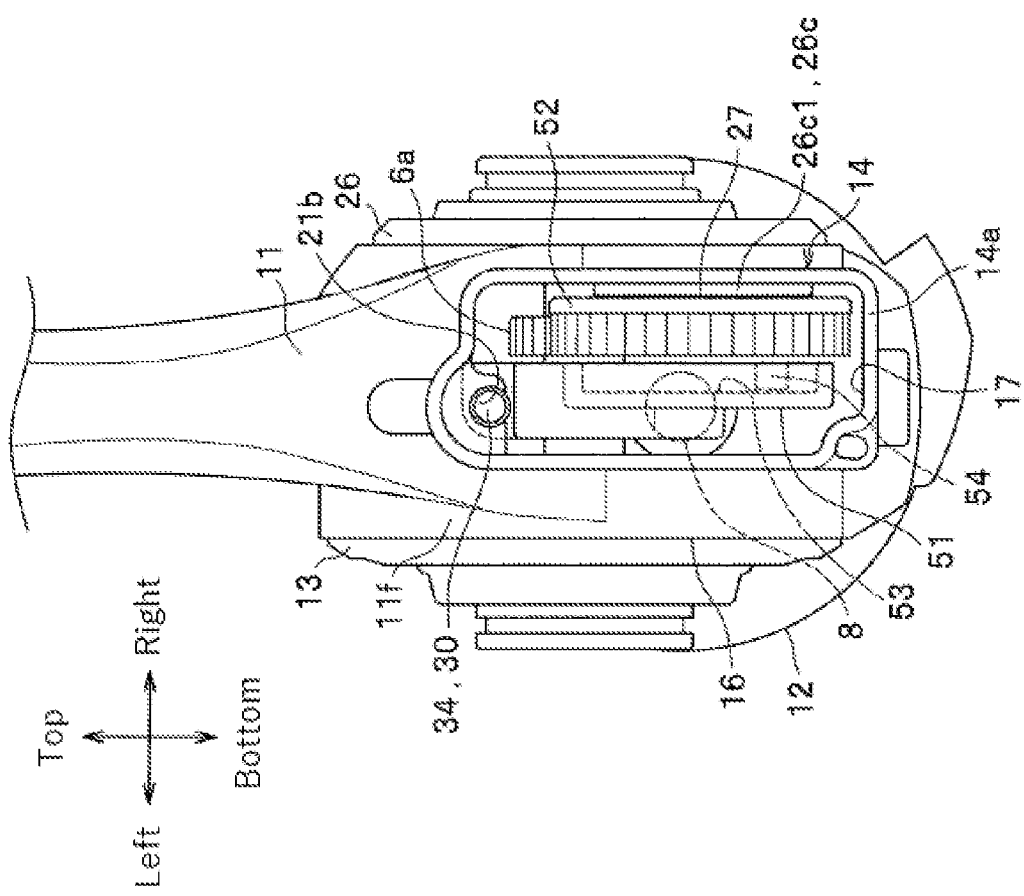
FIG. 10A is a rear view of the reel unit from which the cover member is removed.

The body front portion 12 is situated within the cylindrical portion of the rotor 3. As shown in FIGS. 2 and 3, a bottomed-cylindrical cover 12a is attached to the body front portion 12 for protection of functional components housed therein and aesthetic improvement. The cover 12a covers outer peripheral side of the body front portion 12. The rear end of the body front portion 12 forms a flange that has a circular shape as viewed from the rear (see FIGS. 6B, 10A, and 10B) and closes a rear end opening of the rotor 3.

Referring to FIG. 2, the spool shaft 8 extends through the drive shaft sleeve 7 and its front end protrudes frontward beyond the drive shaft sleeve 7. A rear portion of the spool shaft 8 protrudes rearward beyond the rear end of the drive shaft sleeve 7 and is positioned inside the body 11.

Built in the body 11 are a handle shaft 5 that extends in the left-right direction (see FIG. 4), a drive gear 6 and a gear (shaft sleeve) 6a that are fixed to the handle shaft 5, and a spool reciprocating device 50.

As shown in FIG. 4, the handle shaft 5 is rotatably supported by the body 11 and the bearing member 13 through bearings 5c, 5d. A left end portion of the handle shaft 5 penetrates the bearing member 13 and is threadably engaged with a connecting shaft 5b provided on the handle 5a, and the handle shaft 5 is integrated with the handle 5a. The drive gear 6, which meshes with the pinion gear 7a, is fixed on the handle shaft 5 at a position on the left side of the center portion of the handle shaft 5 in the left-right direction.

Accordingly when a winding operation of the handle 5a is performed, a driving force generated by the winding operation is transmitted to the drive shaft sleeve 7 through the handle shaft 5, the drive gear 6, and the pinion gear 7a, thereby to rotate the rotor 3. The gear 6a for driving the spool reciprocating device 50 is fixed on the handle shaft 5 at a position on the right side of the center portion of the handle shaft 5 in the left-right direction (see FIG. 3).

Referring to FIGS. 2 and 3, the spool reciprocating device 50 includes a screw member 30 that serves as a guide shaft, a slider 51, and an interlocking gear 52. The screw member 30 is a fastener for fastening the cover member 15 to the body 11 and also serves as a guide shaft. The screw member 30 extends through front and rear insertion holes 21a, 21b formed in a cylindrical portion 21 of the body 11. The rear end of the screw member 30 is threadably engaged with the cover member 15. The screw member 30 will be described later in details.

The slider 51 moves in the front-rear direction along the screw member 30 and has a guide groove 53 (see FIGS. 4, 5, 10A) formed in the right side surface thereof. The guide groove 53 is engaged with an eccentric protrusion 54 provided on the interlocking gear 52. As shown in the rear view of FIG. 10A, the guide groove 53 extends in the top-bottom direction across the spool shaft 8. The guide groove 53 is arranged such that a part of the bottom portion of the guide groove 53 overlaps a part of the spool shaft 8. Accordingly, in this arrangement, the reel unit 10 (the body 11) can be downsized in the left-right direction (along the handle shaft 5), as compared to other arrangements.

As shown in FIG. 3, a recess is formed rearward in an upper portion (an opposed portion opposed to the handle shaft 5) of the slider 51. Therefore, as shown in FIG. 15B, when the slider 51 moves frontward, the handle shaft 5 can be received in the recess 55. Thus, the movement range of the slider 51 is extended frontward. As described above, the moving range (stroke) of the slider 51 is effectively secured while controlling the size increase of the body 11.

As shown in FIG. 3, the top end portion of the slider 51 has a guide shaft insertion hole 56 extending therethrough in the front-rear direction. The screw member 30 extends through the guide shaft insertion hole 56. Thus, the slider 51 is slidable in the front-rear direction while keeping its attitude along the screw member 30.

As shown in FIG. 4, the slider 51 is coupled with a projection 8a that projects rearward from the rear end of the spool shaft 8. Thus, the slider 51 is integrated with the spool shaft 8. The slider 51 and the projection 8a are fastened together by a fixing screw 8b.

As shown in FIG. 2, the interlocking gear 52 is positioned on the bottom portion of the cylindrical portion 21 of the body 11 on the lower rear side of the handle shaft 5 and is meshed with a rear side of the gear 6a. Accordingly when a winding operation of the handle 5a is performed, a driving force generated by the winding operation is transmitted to the interlocking gear 52 through the gear 6a, thereby to rotate the interlocking gear 52. Further, the eccentric protrusion 54 of the interlocking gear 52 presses a front surface or a rear surface of the guide groove 53 of the slider 51, which causes the slider 51 and the spool shaft 8 (the spool 104) to reciprocate in the front-rear direction along the guide shaft (the screw member 30).

Each component will now be described in detail As shown in FIGS. 3 and 6A, the body 11 has a bottomed-box shape (cylindrical shape) with a peripheral wall at the bottom portion and is open toward the left side. The body 11 includes a right wall portion 20 having a disk-like shape and a cylindrical portion 21 that extends toward the left side from the peripheral edge of the right wall portion 20. The left end portion of the cylindrical portion 21 forms the side opening portion 16. The body 11 is integrally formed of a synthetic resin material As shown in FIG. 6A, an inner surface (a left side surface) of the right wall portion 20 has a right center hole 23, a rib 24, and an insertion hole 25 formed therein. The right center hole 23 is a hole through which the right end portion of the handle shaft 5 extends and is provided at the center portion of the right wall portion 20.

The rib 24 is generally L-shaped as viewed from the side and is positioned frontward of the right center hole 23. The rib 24 includes a front-rear rib 24a that extends in the front-rear direction and a top-bottom rib 24b that is continuous to the rear end portion of the front-rear rib 24a and extends downward.

The front-rear rib 24a has a plate-like shape and the front end portion thereof is connected to an inner peripheral surface 21c of the cylindrical portion 21 of the body 11. The top-bottom rib 24b is connected at the lower end portion thereof to the lower portion of the inner peripheral surface 21c of the cylindrical portion 21 of the body 11. The rib 24 enhances the strength of the right wall portion 20 and the front and lower portions of the cylindrical portion 21. The top-bottom rib 24b has a through-hole 24c formed therein to allow the rear portion of the spool shaft 8 to extend rearward therethrough. The through-hole 24c is situated below the central axis O2 of the handle shaft 5. Therefore, the rear portion of the spool shaft 8 is disposed below the handle shaft 5 (on the side opposite to the leg portion 11a).

In the rear surface of the top-bottom rib 24b, a recess 24e is formed frontward The recess 24e has an arc-shaped cavity and serves to avoid interference between the top-bottom rib 24b and the gear 6a. A rear bearing 8c2 is fitted in the through-hole 24c to support the rear end of the drive shaft sleeve 7 (see FIG. 3).

Figure 5:
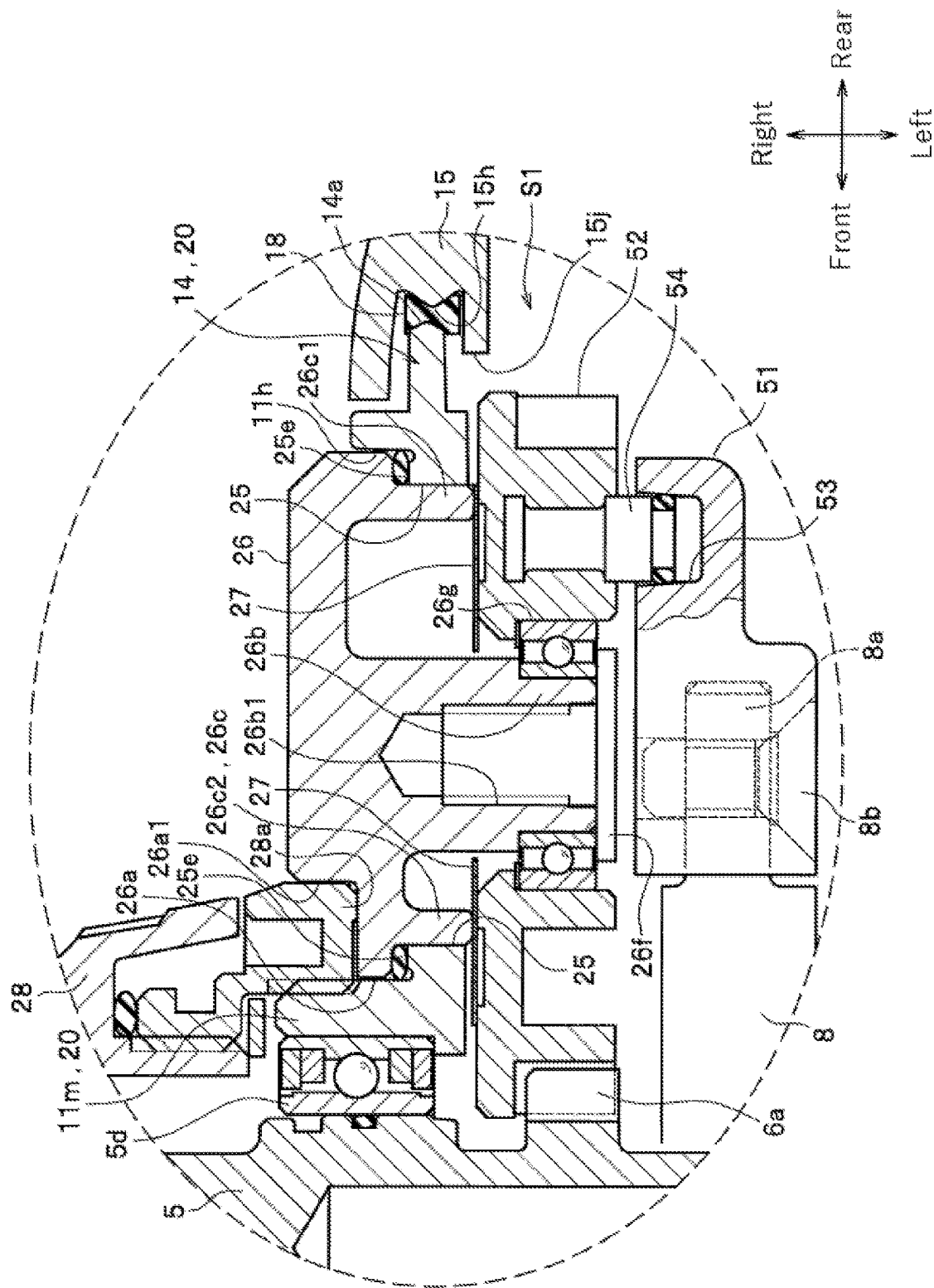
FIG. 5 is an enlarged view of a part of FIG. 4, showing a support structure of an interlocking gear.
Figure 11:
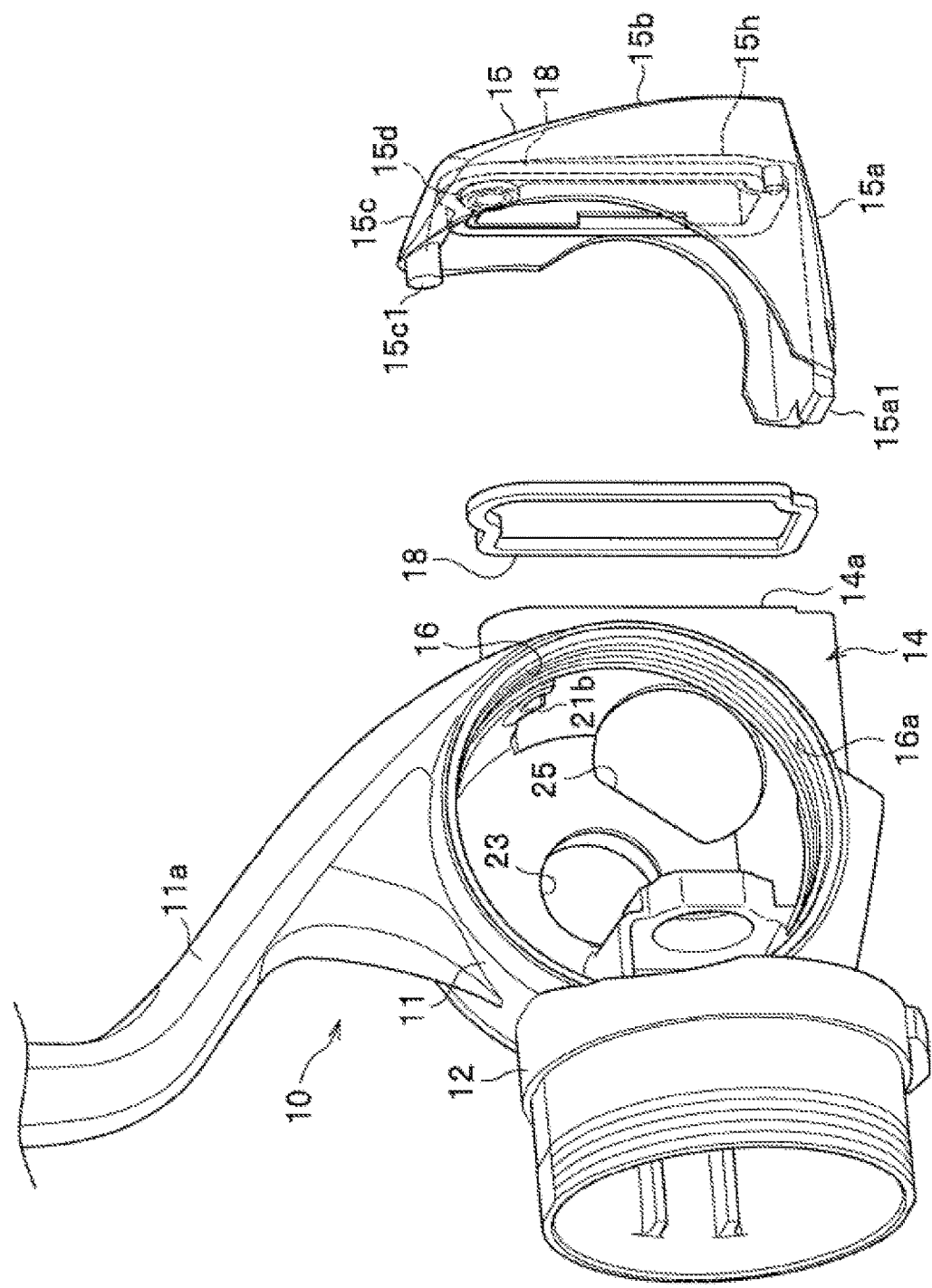
FIG. 11 is an exploded perspective view of the body and the cover member.
Figure 14:
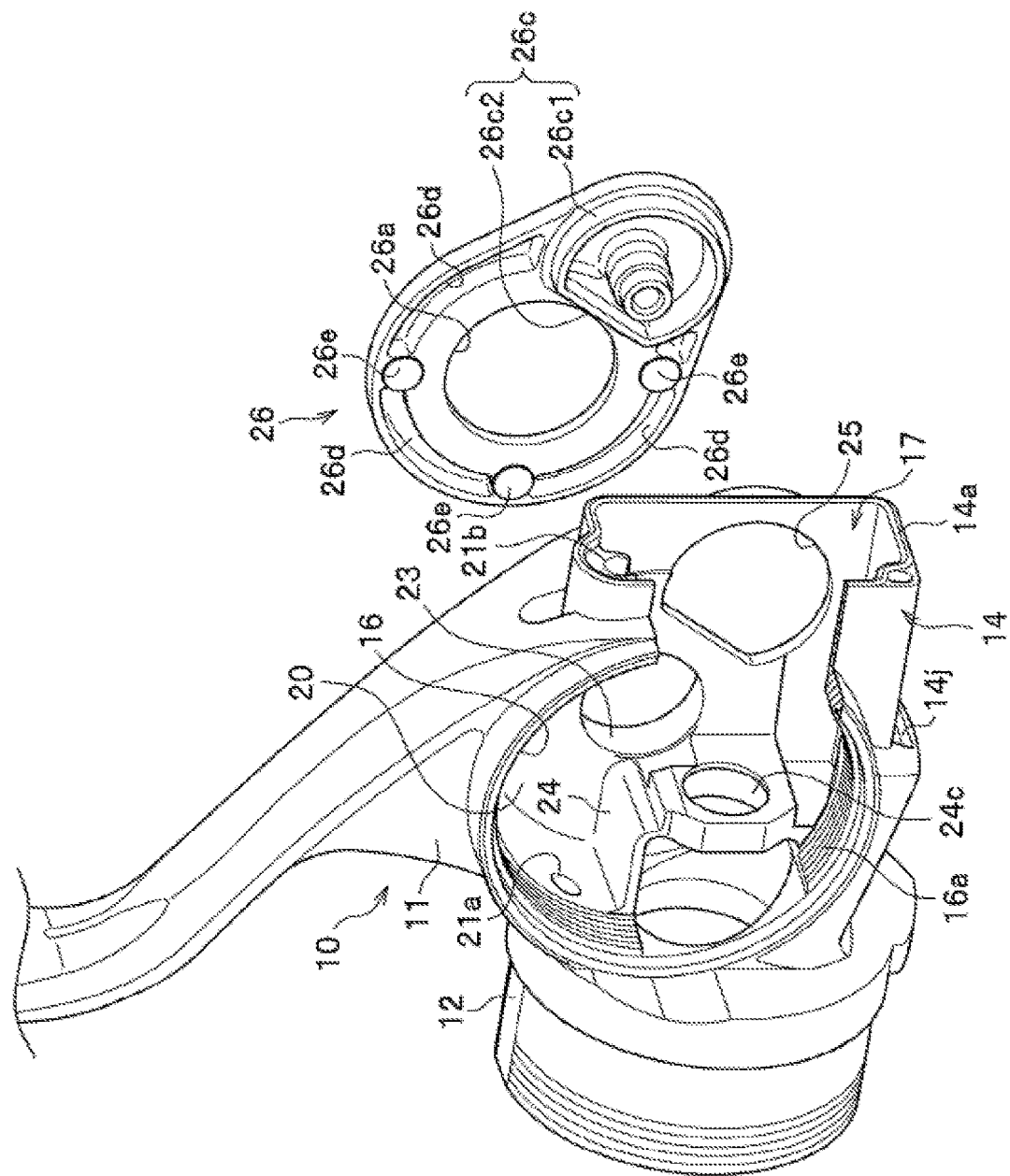
FIG. 14 is a partially cut perspective view showing a positional relationship between the reel unit and the support member.

As shown in FIGS. 6A, 11, and 14, the insertion hole 25 is generally D-shaped as viewed from the side. As shown in FIG. 6A, the insertion hole is formed on a lower rear side of the right center hole 23. Through the insertion hole 25, there extends a boss 26b and a support rib 26c of the support member 26 provided on the outside (the right side surface) of the right wall portion 20, as shown in FIG. 5. Thus, the boss 26*b* and the support rib 26*c*, which rotatably supports the interlocking gear 52, are disposed in the rear portion of the body 11.

As shown in FIG. 6A, the cylindrical portion 21 of the body 11 is formed in a substantially cylindrical shape centering on the central axis O2 of the handle shaft 5. More particularly, an inner peripheral surface 21*c* of the cylindrical portion 21 is formed in a substantially circular shape centering on the central axis O2 of the handle shaft 5, and corresponds to the size of the drive gear 6. An outer peripheral surface 21*d* of the cylindrical portion 21 is also formed in a substantially circular shape centering on the central axis O2 of the handle shaft 5. Therefore, the thickness (radial thickness) of the cylindrical portion 21 is substantially uniform in the circumferential direction. More specifically, the cylindrical portion 21 has a smaller size than a cylindrical portion (the cylindrical portion having a substantially rectangular cylindrical shape as viewed from the side) in conventional fishing spinning reels, and there is no unnecessary space between the inner peripheral surface 21*c* of the cylindrical portion 21 and the drive gear 6.

As shown in FIG. 3, the insertion hole 21*a* is formed in the cylindrical portion 21 above the front-rear rib 24*a*. The insertion hole 21*a* has a circular shape as viewed in the front-rear direction and extends through the front part of the cylindrical portion 21 in the front-rear direction. The front end of the insertion hole 21*a* is open to the front surface of the bottom portion 12*c* of the body front portion 12, and the rear end thereof is open to the rear surface of the cylindrical portion 21 and communicates with the upper space (the space above the handle shaft 5) in the body 11. The insertion hole 21*a* is parallel with the central axis O1 of the spool shaft 8. The screw member 30 serving as a guide shaft extends through the insertion hole 21*a* and is supported at the front portion thereof on the insertion hole 21*a*.

Figure 6B:
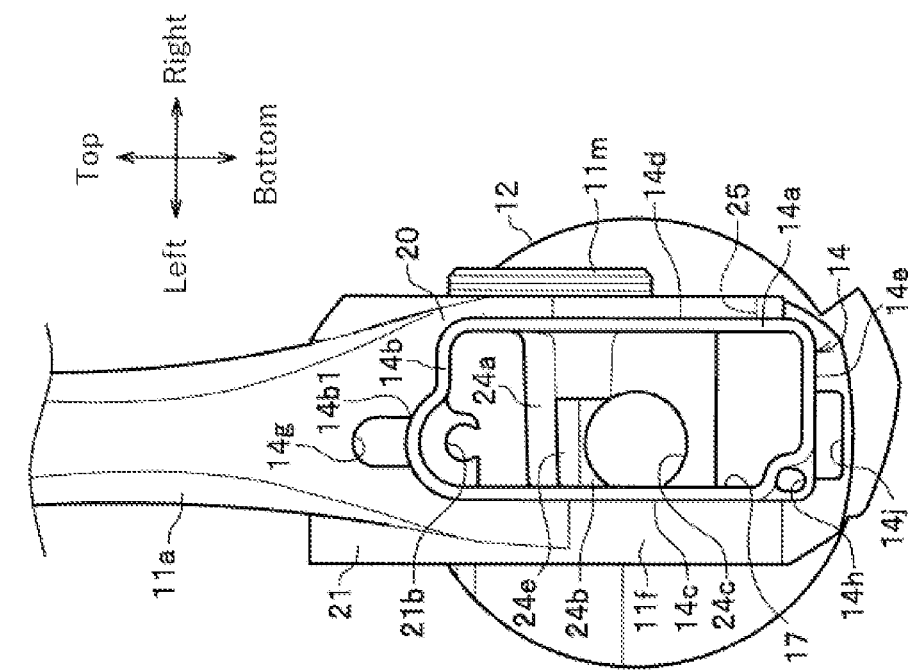
FIG. 6B is a rear view of the body from which the cover member is removed.
Figure 6A:
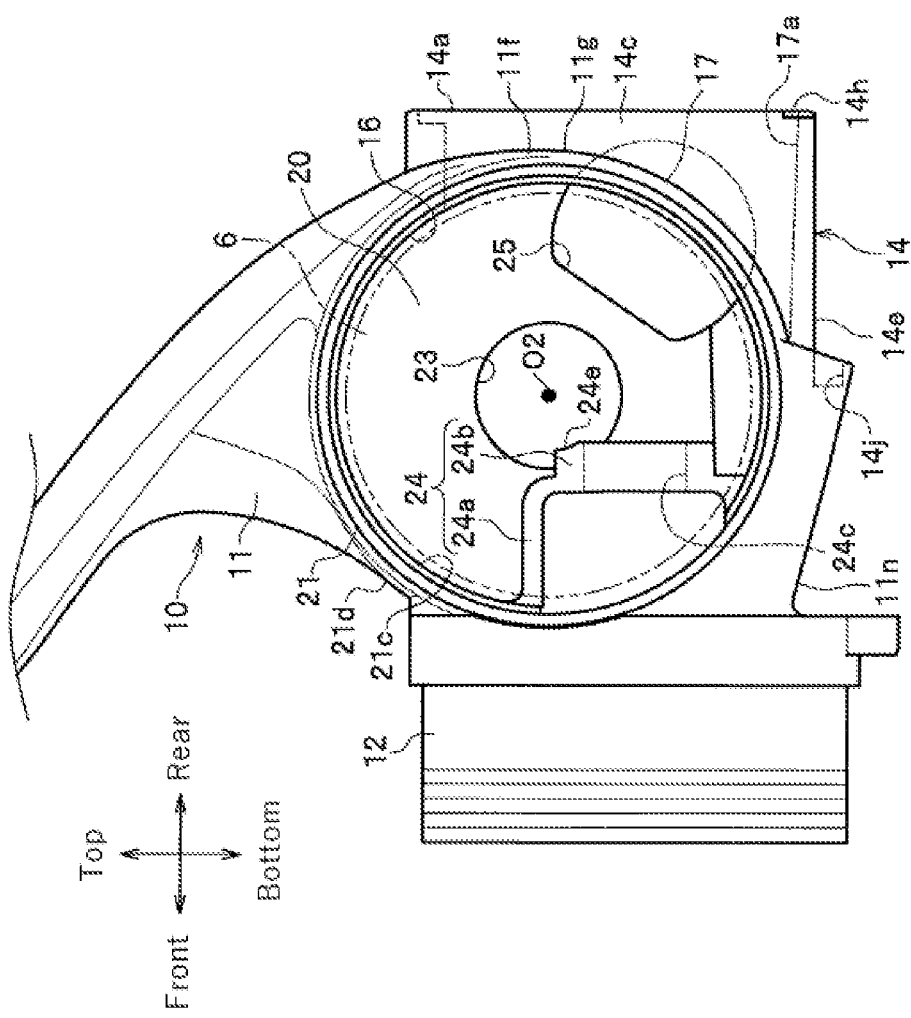
FIG. 6A is a left side view of the body.

Referring to FIGS. 6B and 14, the rear portion of the cylindrical portion 21 has a rear opening portion 17 formed therein to extend through the rear portion of the cylindrical portion 21. The rear opening portion 17 has a substantially rectangular shape that is longer in the top-bottom direction as viewed from the rear. The rear opening portion 17 is an opening for receiving a part of a component that is built in the body 11 and allowing a part of the component to protrude outside of the body 11, or rearward from the body 11. The rear opening portion 17 also serves as a port for components to be built into the body 11. Further, the presence of the rear opening portion 17 reduces the weight of the body 11.

Further, as shown in FIG. 6B, the rear opening portion 17 extends through only the substantially central portion of the cylindrical portion 21 in the left-right direction. Therefore, the opening (aperture) of the rear opening portion 17 and the opening (aperture) of the side opening portion 16 are not continuous to each other. In other words, an arc-shaped bridge portion 11*f* that forms the edges of the respective apertures of the side opening portion 16 and the rear opening portion 17 extends between the side opening portion 16 and the rear opening portion 17. Therefore, as compared with the case where the opening (aperture) of the rear opening portion 17 is continuous with the opening (aperture) of the side opening portion 16, strength of the cylindrical portion 21 is improved. As a result, durability of the body 11 is enhanced.

As shown in FIGS. 6A and 6B, the peripheral wall portion 14 is formed along the opening edge of the rear opening portion 17 (around the rear opening portion 17) that forms a rear end surface of the cylindrical portion 21. The peripheral wall portion 14 extends from the entire circumference of the peripheral edge portion (the opening edge) of the rear opening portion 17 toward the cover member 15 and fits in the inner portion of the cover member 15, thereby serving as a fitting portion having a tubular wall shape. The peripheral wall portion 14 also serves as a receiver for receiving a part of a component projecting rearward from inside the body 11.

The peripheral wall portion 14 forms a substantially rectangular frame according to the shape of the opening of the rear opening portion 17 as viewed from the rear. The rear end portion 14*a* of the peripheral wall portion 14 that forms an extended end portion is positioned in a virtual plane perpendicular to the fitting direction of the cover member 15 onto the peripheral wall portion 14. The fitting direction of the cover member 15 extends along the central axis O1 of the spool shaft 8 and extends along the screw member 30.

As shown in FIG. 6A, the entirety of the rear end portion 14*a* is positioned rearward of the rearmost end portion 11*g* of the body 11 (the rearmost end portion of the bridge portion 11*f*) as viewed from the axial direction of the handle shaft 5 (as viewed from the side). In other words, the peripheral wall portion 14 is continuous to and integrated with the rear end portion (the bridge portion 11*f*) of the body 11 and projects rearward to form the fitting margin on which the cover member 15 is to be fit. In the embodiment, the body 11 has the body front portion 12 integrally formed on the front side thereof and also has the peripheral wall portion 14 integrally formed on the rear side thereof.

As shown in FIG. 6B, the peripheral wall portion 14 is configured such that a top surface 14*b* thereof has a left portion 14*b*1 protruding upward in a curve. Inside the left portion 14*b*1, there is provided an insertion hole 21*b* encircled by a wall portion having a C-shaped cross section. The insertion hole 21*b* extends through the rear part of the cylindrical portion 21 in the front-rear direction. The front end of the insertion hole 21*b* is open to the front surface of the cylindrical portion 21, and the rear end thereof is open to the inside of the peripheral wall portion 14. The insertion hole 21*b* is parallel with the central axis O1 of the spool shaft 8 (see FIG. 2) and is aligned with the front insertion hole 21*a* in the axial direction. The insertion hole 21*a* receives the screw member 30 inserted therethrough from the front to serve as a guide shaft. The insertion hole 21*b* supports the rear part of the screw member 30.

The insertion hole 21*b* is open at the lower side thereof, reducing the amount of projection into the rear opening portion 17 as compared to the case where the insertion hole 21*b* is not open in this way. This secures the size of the space of the rear opening portion 17 in the top-bottom direction, making it possible to dispose the spool reciprocating device 50 in the limited space within the body 11.

The thickness of the left side of the insertion hole 21*b* is larger than the thickness of the right side thereof. This controls the inclination of the slider 51 (the inclination in the counterclockwise direction around the spool shaft 8 (as viewed from the rear)) that may occur during high load winding operation in actual fishing. In other words, the strength of the side that receives a high load is secured to control the inclination of the guide shaft (the screw member 30) during high load winding operation. Thus, the slider 51 can reciprocate smoothly in the front-rear direction along the guide shaft (the screw member 30).

In a rear edge portion of the body 11 on top of the left portion 14*b*1 as viewed from the rear, there is formed a top engagement hole 14*g*. The top engagement hole 14*g* is circularly shaped at the top side and has a predetermined depth. The top engagement hole 14*g* is positioned above the insertion hole 21*b* as viewed from the rear, and it is also possible to position the top engagement hole 14g on the upper left side or the upper right side of the insertion hole 21b.

The peripheral wall portion 14 has a left side surface 14c, a right side surface 14d, and a bottom surface 14e, each shaped in a flat plane. At the lower left corner of the rear end portion 14a of the peripheral wall portion 14, there is formed a positioning hole 14h for positioning the cover member 15 being attached and built in. In the lower left corner, the rear end portion 14a of the peripheral wall portion 14 extends via the upper side of the positioning hole 14h. Further, as shown in FIG. 3, in the front portion of the bottom surface of the peripheral wall portion 14, there is formed a bottom engagement hole 14j that is open rearward. The bottom engagement hole 14j has a rectangular shape that is flat in the left-right direction as viewed from the rear.

In front of the bottom engagement hole 14j, the body 11 has a finger grip 11n cut in the lower portion thereof. As shown in FIG. 3, the finger grip 11n is recessed upward in the direction of the leg portion 11a. The finger grip 11n is formed with an inclination of the outer surface of the body 11 having the engagement hole 14j formed therein, and the inclination is made toward the leg portion 11a and extends frontward, such that a finger can be retained easily so as not to slide rearward.

Next, a description is given of the cover member 15. The cover member 15 is made of a synthetic resin material and, as shown in FIG. 1, has a substantially falcate shape as viewed from the side. As shown in FIG. 3, the cover member 15 is fitted on so as to cover the peripheral wall portion 14 in the rear portion of the body 11, and is fastened with one screw member 30. The cover member 15 includes a bottom portion 15a that extends in the front-rear direction, a trunk portion 15b that rises upward from the bottom portion 15a in the front oblique direction, and a top portion 15c that extends frontward from the top end of the trunk portion 15b.

The inner surface of the cover member 15 is recessed rearward In other words, the cover member 15 has a bottomed cylindrical shape that is open toward the front, and a space is formed on the front surface side of the cover member 15. Therefore, it is possible to house, in the interior of the cover member 15, a part of a component that projects rearward from inside the body 11 through the rear opening portion 14 and the peripheral wall portion 14. Hereinafter the internal space of the cover member 15 (including the space inside the peripheral wall portion 14) may be referred to as the interior of the cover member 15 or the housing space S2.

Figure 9:
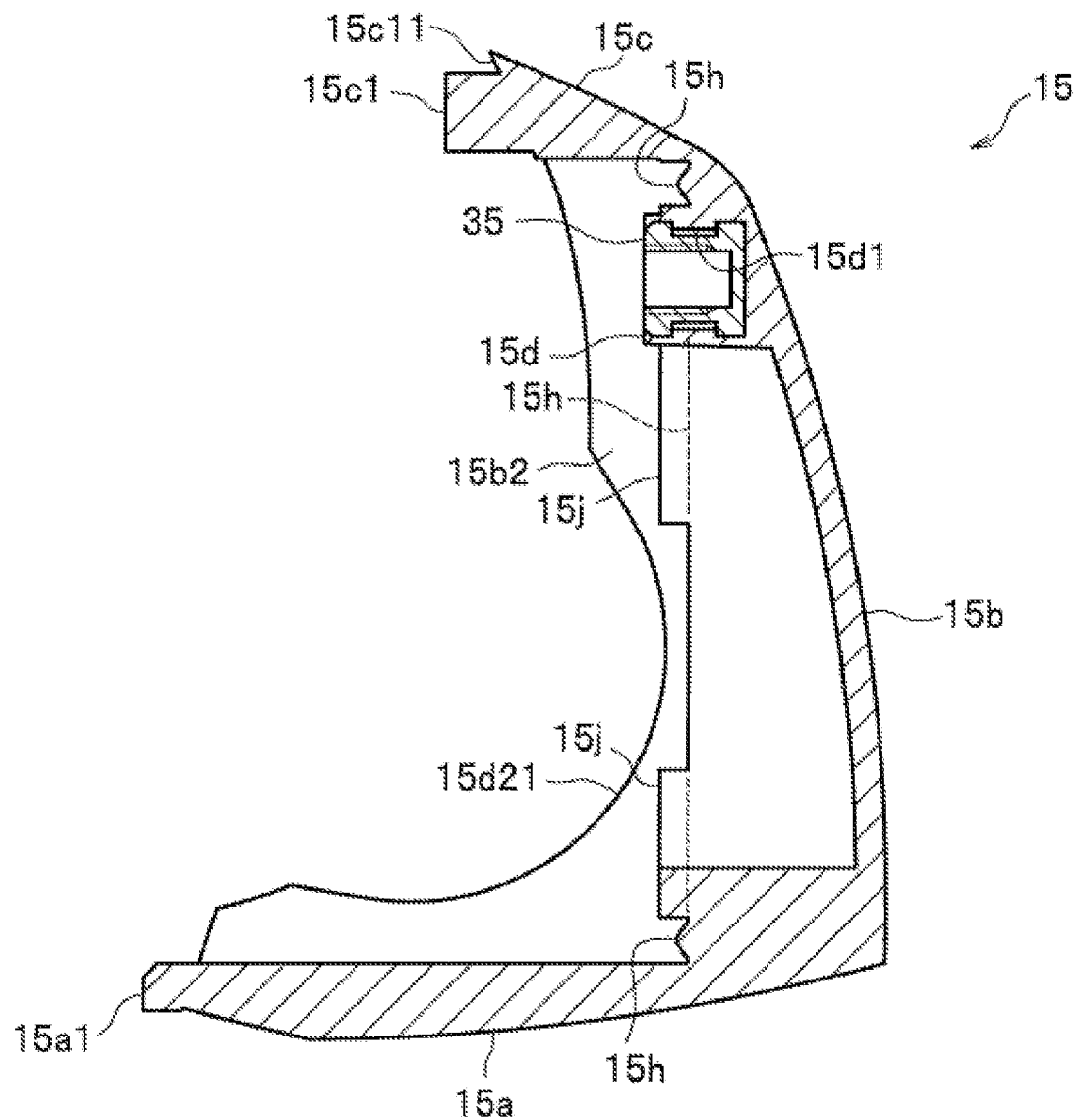
FIG. 9 is an enlarged longitudinal sectional view of the cover member.

As shown in FIGS. 8A and 9, the cover member 15 includes an annular retainer (a conformity portion) 15h opposed to the rear end portion 14a of the peripheral wall portion 14 that forms an extended end portion. The retainer 15h projects inward from the inner peripheral surface of the cover member 15 and has a shape conforming to the rear end portion 14a. The retainer 15h has an annular seal member 18 (see FIGS. 3 and 11) disposed so as to be pressure-bonded between the retainer 15h and the rear end portion 14a of the peripheral wall portion 14. More specifically, the seal member 18 is positioned inside the cover member 15 so as not to appear outside of the reel unit 10. On the inner peripheral edge portion of the retainer 15h, there is formed an edge rib 15j that projects frontward (toward the rear opening portion 17). The edge rib 15j restricts radial movement of the annular seal member 18 retained on the retainer 15h and prevents the seal member 18 from removing internally. It is also possible that the rear end portion 14a is pressure-bonded to the inner surface of the trunk portion 15b of the cover member 15 with the seal member 18 interposed therebetween.

The edge rib 15j is disposed on the inner peripheral side of the rear end portion 14a of the peripheral wall portion 14, and as shown in FIG. 5, the edge rib 15j is positioned between the retainer 15h and the rear end portion 14a such that the gap between the edge rib 15j and the rear end portion 14a is small, thereby to form a labyrinth structure. The edge rib 15j and the rear end portion 14a overlap each other as viewed from the axial direction of the handle shaft 5 (as viewed from the side). Further, the opposed surfaces of the rear end portion 14a of the peripheral wall portion 14 and the retainer 15h have a ridge shaped section projecting toward the seal member 18. Thus, squeezing of the screw member 30 causes the rear end portion 14a of the peripheral wall portion 14 and the retainer 15h to bite into the seal member 18, thereby to improve waterproofness, in addition to the labyrinth structure.

As shown in FIG. 8A, in the top left corner of the top inner surface, which is on one side of the cover member 15 made of a synthetic resin, there is formed a boss 15d having a bottomed cylindrical shape so as to project frontward (toward the body 11). On the boss 15c an internal screw member 35 made of a metal and serving as a screw portion is integrated by insert molding, press-fitting, bonding, or the like. The internal screw member 35 is threadably engaged with the screw member 30. As shown in FIG. 9, the front end portion of the boss 15d (the front end portion of the internal screw member 35) projects frontward of the retainer 15h and the edge rib 15j. As shown in FIG. 8A, the retainer 15h extends along the outer peripheral surface of the boss 15d via a detour on the top side of the boss 15d Thus, the boss 15d is disposed in the inside region inside the annular seal member 18.

On the front end portion of the top portion 15c of the cover member 15, there is formed a top projection 15c1 that projects frontward in a cylindrical shape. The top projection 15c1 is formed in the vicinity of the boss 15d. In the embodiment, the top projection 15c1 is positioned on the top side of the boss 15d. The front end surface 15c11 of the top portion 15c on which the top projection 15c1 is formed is an inclined surface conforming to the inclination of a portion of the rear portion of the body 11 opposed thereto.

As shown in FIG. 8A, in the lower left corner of the retainer 15h of the cover member 15, a projection 15e is formed to project frontward (toward the body 11). The projection 15e is opposed to the positioning hole 14h provided in the lower left corner of the peripheral wall portion 14 of the body 11, such that the projection 15e is inserted into the positioning hole 14h when the cover member 15 is fitted on the peripheral wall portion 14.

As shown in FIGS. 8A to 8C, on the front end portion of the bottom portion 15a, which is on the other side of the cover member 15, there is formed an engagement piece 15a1 so as to project frontward. The engagement piece 15a1 serves as an engagement portion for engaging the bottom portion of the cover member 15 with the body 11. As shown in FIG. 8A, the engagement piece 15a1 is long in the left-right direction and short in the top-bottom direction, thus having a flat shape as viewed in the front-rear direction, so as to conform to the bottom engagement hole 14j provided in the bottom surface of the peripheral wall portion 14. The engagement piece 15a1 engages with the bottom engagement hole 14j of the body 11 when the cover member 15 is fitted on the peripheral wall portion 14, so as to prevent the bottom portion 15a side of the cover member 15 from coming off downward.

As shown in FIGS. 8B and 8C, the shape of the front end edge 15b11 of the left side surface 15b1 of the cover member 15 and the shape of the front end edge 15b21 of the right side surface 15b2 are asymmetric with each other. As shown in FIG. 8B, the front end edge 15b11 of the left side surface 15b1 of the cover member 15 has an arc-like shape extending along the left rear edge of the body 11 (the left side edge of the bridge portion). On the other hand, as shown in FIG. 8C, the front end edge 15b21 of the right side surface 15b2 of the cover member 15 partially has an arc-like shape having a small radius and extending along the right rear edge of the body 11 (the right end edge of the support member 26 (described later)).

As shown in FIG. 8D, the cover member 15 has a horizontally asymmetric shape as viewed from the rear. This shape can be modified as necessary in accordance with the shape of the rear portion of the body 11, and for example, it can be horizontally symmetric.

Next, a description is given of the screw member 30. As shown in FIG. 3, the screw member 30 extends in the front-rear direction of the reel unit 10. As shown in FIG. 7A, the screw member 30 includes a shaft portion 31 having a cylindrical shape and a head portion 32 having a larger diameter than the shaft portion 31. The screw member 30 further includes an external screw 33 provided on the opposite end (the rear end) of the shaft portion 31 and a small diameter portion 34 extending rearward from the opposite end (the rear end) of the external screw 33 and having a smaller diameter than the external screw 33.

The shaft portion 31 has a length extending between the front and rear insertion holes 21a, 21b. As shown in FIGS. 3 and 4, the head portion 32 is inserted and retained in a recess 12c1 formed in the bottom portion 12c of the body front portion 12.

The external screw 33 is threadably engaged with the internal screw member 35 of the cover member 15. When the external screw 33 is threadably engaged with the internal screw member 35, the small diameter portion 34 passes through the internal screw member 35 and abuts against a bottom portion 35a of the internal screw member 35. The end surface of the small diameter portion 34 abuts against the bottom portion 35a, and the cover member 15 is fixed directly to the body 11.

When the screw member 30 is inserted through the body 11, the opposite end side of the screw member 30 is inserted from the front of the body 11 into the recess 12c1 of the body front portion 12. The screw portion 30 is inserted through the recess 12c1 and the screw insertion hole 21a, and then inserted through the housing space S1 and the rear screw insertion hole 21b, until it contacts with the internal screw portion 35 of the cover member 15.

When the screw member 30 is rotated for squeezing, the external screw 33 is threadably engaged with the internal screw member 35, and the distance between the head portion 32 and the cover member 15 is reduced, causing the cover member to move frontward. Since the cover member 15 is fitted on the peripheral wall portion 14 forming a substantially rectangular frame, the cover member moves frontward keeping its attitude. Thus, the rear end portion 14a of the peripheral wall portion 14 bites into the front surface of the seal member 18 in a substantially uniform manner, and the retainer 15h of the cover member 15 bites into the rear surface of the seal member 18 in a substantially uniform manner. Thus, the retainer 15h of the cover member 15 and the rear end portion 14a of the peripheral wall portion 14 are bonded tightly to the seal member 18 on the front and rear side thereof. In addition, the front end surface 15c11 of the top portion 15c of the cover member 15 contacts with a corresponding portion of the rear portion of the body 11, and the engagement piece 15a1 of the bottom portion of the cover member 15 is pressed against the bottom engagement hole 14j of the bottom portion of the body 11 in such a direction as to deepen the engagement. Thus, the engagement piece 15a1 is engaged strongly with the bottom engagement hole 14j, so as to prevent the bottom portion side of the cover member 15 from removing from the body 11.

Subsequently, the small diameter portion 34 on the opposite end side of the shaft portion 31 approaches and abuts against the bottom portion 35a of the internal screw member 35, thus restricting the squeezing. More specifically, the pressure-bonding force produced by screwing of the screw member 30 is restricted by abutting of the small diameter portion 34 of the screw member 30 against the bottom portion 35a of the internal screw member 35 (see FIG. 7B). Accordingly, there is no need of forming the body 11 such that its portion associated with screwing of the screw member 30 has a large thickness. Thus, it is possible to reduce the size and weight of the body 11, thereby to facilitate the fishing operation such as casting and winding.

As described above, the cover member 15 can be suitably fixed to the body 11 by only the squeezing of one screw member 30. As shown in FIG. 3, when the screw member 30 is squeezed to fix the cover member 15 to the body 11, the front end portion of the internal screw member 35 faces the rear end surface of the peripheral wall of the insertion hole 21b positioned frontward of the internal screw member 35, leaving a gap therebetween. Thus, the tight bonding to the seal member 18 is secured in fixing of the cover member 15.

As shown in FIGS. 12A and 12B, an attachment portion 11h is recessed in the right side portion of the body 11. The attachment portion 11h has a cam-like shape narrower toward the rear end as viewed from the right side, and the attachment portion 11h is formed around a handle support portion 11m having a cylindrical shape and provided on the right side portion of the body 11. On the attachment portion 11h, there is provided a support member 26 also having a cam-like shape as viewed from the right side (see FIG. 12A).

Figure 13A:
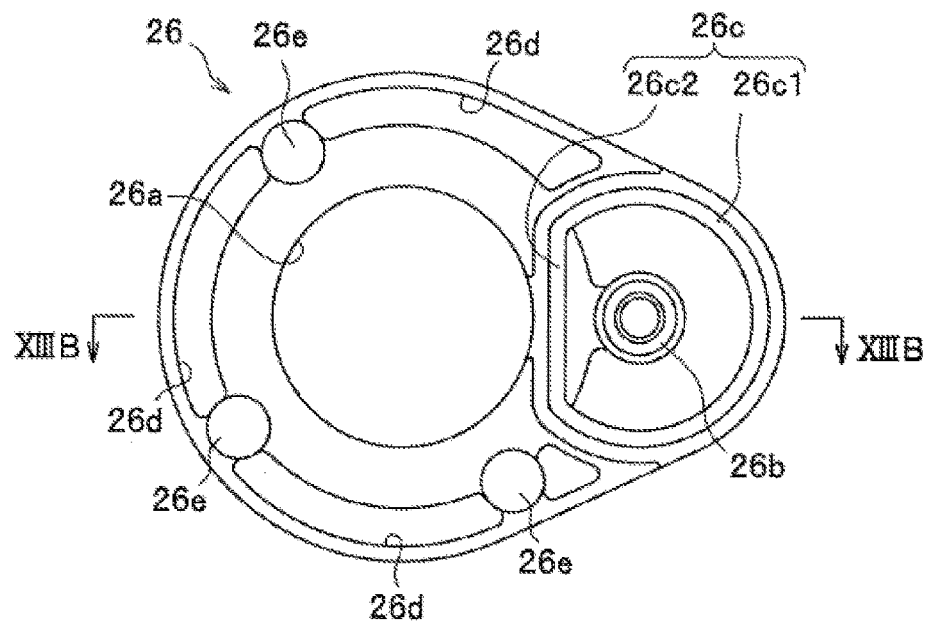
FIG. 13A is a left side view of the support member.
Figure 13B:
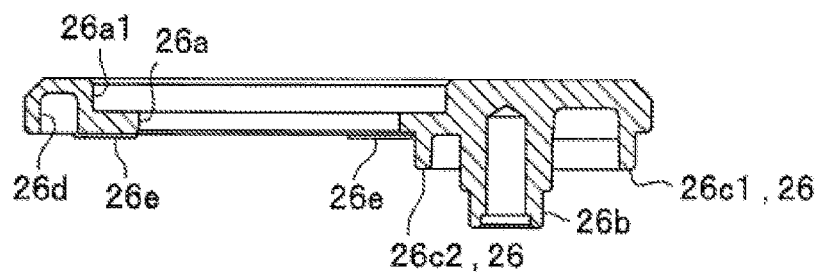
FIG. 13B is a sectional view of the support member cut along the line XIIIB-XIIIB in FIGS. 13A, and 13C is an enlarged sectional view of a boss and a support rib in the support member.
Figure 13C:
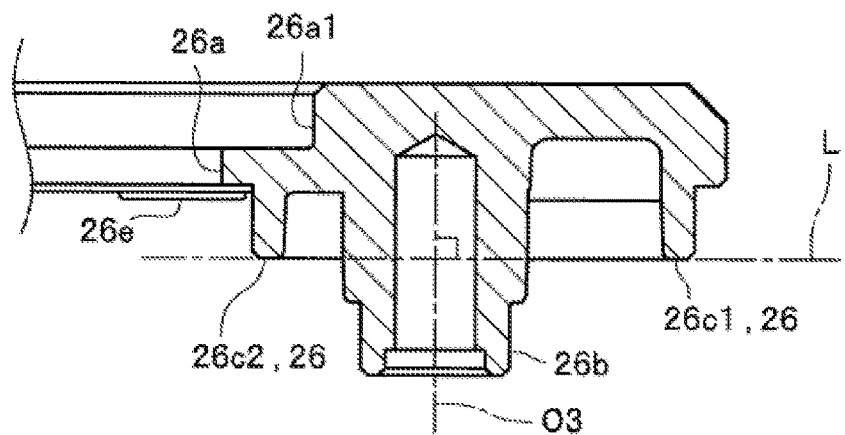

As shown in FIGS. 13A to 13C, the support member 26 has a plate-like shape. The support member 26 has a circular hole 26a through which to insert the handle support portion 11m (see FIG. 12B). In the outer peripheral portion of the circular hole 26a, there is formed a circular step 26a1 having a larger diameter than the circular hole 26a (see FIGS. 13A and 13C). As shown in FIG. 5, a cap support member 28a threadably fixed on the handle support portion 11m contacts with the circular step 26a1. Thus, the support member 26 is retained by the attachment portion 11h so as not to come off.

As shown in FIGS. 13B and 13C, the left side portion of the rear side of the support member 26 is integrated with the boss 26b that projects toward the left side and serves as a support portion. In addition, the support rib 26c, which is substantially D-shaped as viewed from the left side, is integrated with the support member 26 so as to encircle the boss 26b. The support rib 26c projects toward the left side along with the boss 26b. The support rib 26c includes a circular arc portion 26c1 and a straight line portion 26c2 continuous to the circular arc portion 26c1. As shown in FIG. 14, the support rib 26c conforms to the inner shape of the insertion hole 25 in the right wall portion 20 of the body 11 and is inserted into the insertion hole 25. As shown in FIGS. 4 and 5, when the support member 26 is attached to the attachment portion 11h, the boss 26b and the support rib 26c penetrate the insertion hole 25 and are placed in the housing space S1.

As shown in FIG. 5, the interlocking gear 52 is supported on the boss 26b through a bearing 26g. The boss 26b serves as a support shaft for the interlocking gear 52. More specifically, the interlocking gear 52 is configured to be supported by the support member 26 attached to the body 11 without being directly supported by body 11. Accordingly, there is no need of providing a boss for supporting the interlocking gear 52 on the inner surface of the right side portion of the body 11.

The support rib 26c serves as a receiving seat for receiving the right side surface of the interlocking gear 52. As shown in FIG. 13C, the left end surface of the support rib 26c lies in the plane L. The axis O3 of the boss 26b is perpendicular to the plane L. Thus, the support rib 26c can maintain the perpendicularity of the receiving seat with respect to the boss 26b accurately such that the flank lines of the interlocking gear 52 and the gear 6a of the drive gear 6 are aligned with each other. Thus, the proper attitude of the interlocking gear 52 can be maintained irrespective of the shape of the inner surface of the body 11.

For example, in the case where a portion of the right wall portion 20 on which the interlocking gear 52 is placed is inclined due to a draft angle of a mold for molding the body 11 from a synthetic resin, the proper attitude of the interlocking gear 52 can be maintained free from the effect of the inclination. In addition, when the body 11 is made of a metal, it is not necessary to form the inner surface of the portion of the right wall portion 20 on which the interlocking gear 52 is placed so as to be substantially flat in order to maintain the proper attitude of the interlocking gear 52. Accordingly, the production process can be simplified It was described above that the boss 26b and the support rib 26c are integrated with the support member 26, but this is not limitative. It is also possible that the boss 26b and the support rib 26c are formed separately from the support member 26 and assembled on the support member 26.

A sheet-shaped washer 27 is interposed between the support rib 26c and the interlocking gear 52. The washer 27 facilitates smooth rotation of the interlocking gear 52.

As shown in FIG. 5, the bearing 26g is situated such that the right end of the inner ring thereof abuts against a step of the boss 26b and the right end of the outer ring thereof abuts against a step of the interlocking gear 52. The bearing 26g is fastened at the left end of the inner ring thereof with a setscrew 26f threadably engaged with a screw hole 26b1 of the boss 26b.

An O-ring 25e is provided on the peripheral edge portion of the insertion hole 25 for preventing entry of dust and water.

As shown in FIG. 13B, positioning bosses 26e are formed in the outer peripheral portion of the support member 26 at intervals in the circumferential direction. As shown in FIG. 13C, end portions of the positioning bosses 26e project beyond the outer peripheral portion. The positioning boss 26e can be engaged with a circular hole 11e (see FIG. 12B) provided in the attachment portion 11h at a corresponding location. In the outer peripheral portion of the support member 26, there are formed lightening holes 26d between the positioning bosses 26e.

Next, an arrangement of the components of the spool reciprocating device 50 will be described. The spool reciprocating device 50 is arranged in the space (the housing space S1 and the housing space S2) formed by the body 11 and the cover member 15 as follows.

The interlocking gear 52 is built into the body 11 from the rear outside through the peripheral wall portion 14 and the rear opening portion 17. As shown in FIG. 3, a part (the rear region) of the interlocking gear 52 is housed in the peripheral wall portion 14 and the cover member 15. As shown in FIGS. 3 and 4, the screw member 30 that serves as a guide shaft extends through the rear opening portion 17 (see FIG. 2), and the external screw 33 on the rear end of the screw member 30 is threadably engaged with the internal screw member 35 of the boss 15d of the cover member 15. Accordingly, there is no need of providing a structure for fixing the screw member 30 to the rear portion of the body 11, and therefore, the rear portion of the body 11 is simplified and its weight is reduced.

As shown in FIG. 15A, when the slider 51 is pressed by the eccentric protrusion 54 and thereby moved to the rearmost end position, a part (the rear region) of the slider 51 is housed in the cover member 15. That is, the stroke of the slider 51 that moves in the front-rear direction is not limited within the housing space S1 of the body 11 but expanded to the rear side. Thus, even when the cylindrical portion 21 of the body 11 is formed in a cylindrical shape and the housing space Si in the lower side of the body 11 becomes smaller, it is possible to use the interlocking gear 52 of a desired size and secure the reciprocation of the spool reciprocating device 50 in the front-rear direction. Further, since the cover member 15 covers the interlocking gear 52 and the rear opening portion 17 in a fluid-tight manner, it is possible to prevent seawater or dust from adhering to the interlocking gear 52 and from entering the body 11.

Next, the side opening portion 16 and the bearing member 13 will be described in detail with reference to FIG. 4. As shown in FIG. 4, the side opening portion 16 (the left end portion of the cylindrical portion 21) includes the opening for building the components such as the drive gear 6 into the body 11. The inner peripheral surface of the side opening portion 16 is formed in a circular shape that has substantially the same diameter as the inner peripheral surface of the cylindrical portion 21 (see FIG. 3). Therefore, the drive gear 6 that has a relatively large diameter can be built in the cylindrical portion 21 without increasing the size of the body 11. In the inner peripheral surface of the side opening portion 16, there is formed an internal screw portion 16a.

The bearing member 13 is mounted to the side opening portion 16 to close the side opening portion 16 in a fluid-tight manner and support a left end side of the handle shaft 5. The bearing member 13 includes a lid portion 13a having an annular shape and closing the side opening portion 16, a cylindrical portion 13b positioned in the middle of the lid portion 13a and open in the left-right direction, and an insertion portion 13c projecting rightward from the inner surface (the right side surface) of the lid portion 13a and inserted into the side opening portion 16. The cylindrical portion 13b receives the bearing 5c fitted therein, and the bearing 5c supports the handle shaft 5 that extends through the cylindrical portion 13b.

The insertion portion 13c has a cylindrical shape with an outer diameter substantially the same as the diameter of the inner peripheral surface of the side opening portion 16. An external screw portion 13d is formed in the outer peripheral surface of the insertion portion 13c. The insertion portion 13c is inserted in the side opening portion 16, and the external screw portion 13d is threadably engaged with the internal screw portion 16a. Thus, the bearing member 13 is fastened to the side opening portion 16, and thus the bearing member 13 is fixed to the body 11.

In this fixing structure using screws, the insertion portion 13c (the bearing member 13) is threadably engaged in the body 11, and thus the strength of the body 11 is significantly increased. Further, since the entire circumference of the insertion portion 13c is supported on the cylindrical portion 21 (the side opening portion 16), the load from the handle shaft 5 acting on the bearing member 13 during handle operation is dispersed over the entire circumference of the cylindrical portion 21 (the side opening portion 16). As a result, durability of the body 11 is enhanced. In addition, it is also possible that the internal screw portion 16a of the side opening portion 16 and the external screw portion 13d of the bearing member 13 are made of a metal and assembled on integrally by insert molding.

In the fishing spinning reel 1 as described above, the peripheral wall portion is sealed in the cover member 15, and therefore, the seal member 18 is not exposed to the outside and thus is not affected by the outside air or the external load. Accordingly, the interior of the reel unit 10 remains satisfactorily waterproof and dustproof for a long period Since the edge rib 15j that projects toward the rear opening portion 17 is formed on the inner peripheral edge portion of the retainer 15h of the cover member 15, the seal member 18 can be readily installed and retained on the retainer 15h. This facilitates the assembling operation of the seal member 18 on the cover member 15. In addition, the edge rib 15j prohibits displacement of the seal member 18, and thus the seal member 18 is suitably retained on the retainer 15h. Accordingly, the sealing performance can be improved, and the interior of the reel unit 10 remains satisfactorily waterproof and dustproof for a long period.

The rear end portion 14a of the peripheral wall portion 14 is positioned in a virtual plane perpendicular to the fitting direction of the cover member 15 onto the peripheral wall portion 14, and therefore, the rear end portion 14a can be tightly bonded to the seal member 18 in a suitable manner. Accordingly, the sealing performance can be improved, and the interior of the reel unit 10 can be satisfactorily waterproof and dustproof.

In addition, the cover member 15 is fitted on so as to cover the peripheral wall portion 14, and is fastened with one screw member 30. Thus, the cover member 15 is fitted on the peripheral edge portion of the rear opening portion 17 of the body 11 and thus is set in position, and therefore, the cover member 15 is retained stably.

Since the whole of the rear end portion 14a of the peripheral wall portion 14 is positioned rearward of the rear end portion 11f of the body 11, it is possible to secure the fitting margin for the cover member 15 to be fitted on the peripheral wall portion 14. Further, it is possible to secure the size of the peripheral wall portion 14 that is continuous to the rear end portion 11f of the body 11, and therefore, when the body 11 is made of a synthetic resin material, less sink occurs around the rear end portion 11f of the body 11, making it possible to prevent deformation of the body 11.

The bearing member 13 is fixed on the side opening portion 16 by screwing, and therefore, the bearing member 13 is fixed on the side opening portion 16 with a fastening force that is uniform in the circumferential direction. In addition, a plurality of screws for fastening the bearing member 13 to the body 11 can be made unnecessary. In this way, it is possible to reduce the number of components and facilitates assembling and disassembling operation. Further, sufficient strength in mounting the bearing member 13 can be ensured. Since sufficient strength in mounting the bearing member 13 can be ensured, accuracy in supporting the handle shaft 5 and, therefore, accuracy in supporting the drive gear 6 meshed with the pinion gear 7a provided in the body 11 are improved and maintained. Furthermore, the bearing member 13 having a circular shape is mounted by screwing, so that the side opening portion 16 of the body 11 is reinforced, and strength of the body 11 itself is also improved. In addition, when the body 11 is made of a synthetic resin material, the presence of the peripheral wall portion 14 provided in the rear portion of the body 11 reduces the occurrence of sink around the rear opening portion 17 and the side opening portion 16. This prevents deformation of the body 11 and improves the accuracy in screwing of the bearing member 13 onto the side opening portion 16.

The present invention is not limited to the embodiments described above and is susceptible of various modifications. For example, as viewed from the direction of the spool shaft 8, the peripheral wall portion is not limited to the substantially rectangular shape described above but may have various shapes such as an ellipse or an oval.

Further, the rear end portion 14a of the peripheral wall portion 14 does not necessarily in a plane perpendicular to the central axis O1 of the spool shaft 8 (see FIG. 2) but may be in an oblique plane that intersects the central axis O1 obliquely. It is also possible that the rear end portion 14a has an arc-like shape or other various shapes as viewed from the side.

Furthermore, the foregoing embodiment included the spool reciprocation device 50 in which the slider 51 coupled and secured to the projection 8a at the rear portion of the spool shaft 8 is engaged with the eccentric protrusion 54 of the interlocking gear 52 (the constituent member) that rotates in such a manner as to be interlocked with the handle shaft 5, so that rotation of the handle shaft 5 is converted into reciprocation of the spool shaft 8 in the front-rear direction. However, the spool reciprocation device 50 is not limited thereto. For example, the present invention may be implemented by using a spool reciprocation device in which the slider 51 is engaged with a known screw shaft (a constituent member) that rotates in such a manner as to be interlocked with the drive shaft sleeve 7 having the pinion gear 7a.

What is claimed is:

1. A fishing spinning reel, comprising:
    a body constituting a reel unit; and
    a cover member closing a rear opening portion formed in a rear portion of the body,
    wherein the body has a fitting portion formed on a peripheral edge portion of the rear opening portion, the fitting portion having a tubular wall shape extending toward an inner portion of the cover member and fitted in the inner portion of the cover member, and
    a seal member having an annular shape is interposed between the inner portion of the cover member and the fitting portion.

2. The fishing spinning reel according to claim 1, wherein the cover member includes a retainer having an annular shape and opposed to an extended end portion of the fitting portion, and
    the retainer has an edge rib formed on an inner peripheral edge portion thereof, the edge rib projecting toward the rear opening portion.

3. The fishing spinning reel of claim 1, wherein an extended end portion of the fitting portion lies in a virtual plane perpendicular to a fitting direction of the cover member onto the fitting portion.

4. The fishing spinning reel of claim 1, wherein the cover member is fitted on the fitting portion so as to cover the fitting portion and fastened with one screw member.

5. The fishing spinning reel of claim 1, further comprising:
- a side opening portion formed in a side portion of the body; and
- a bearing member closing the side opening portion and supporting a handle shaft,
- wherein the side opening portion has an internal screw portion formed therein, and the bearing member has an external screw portion formed thereon, and
- the bearing member is screwed into the side opening portion and fixed thereto.

\* \* \* \* \*